US012631146B2

(12) United States Patent
Oehrle et al.

(10) Patent No.: US 12,631,146 B2
(45) Date of Patent: *May 19, 2026

(54) GAS TURBINE ENGINE

(71) Applicant: General Electric Company, Evendale, OH (US)

(72) Inventors: Daniel John Oehrle, West Chester, OH (US); Randy M. Vondrell, Newport, KY (US); Apolinario Barra Ruiz, Querétaro (MX)

(73) Assignee: General Electric Company, Evendale, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/063,746

(22) Filed: Feb. 26, 2025

(65) Prior Publication Data

US 2025/0198348 A1      Jun. 19, 2025

Related U.S. Application Data

(63) Continuation-in-part of application No. 18/824,100, filed on Sep. 4, 2024, which is a continuation of
(Continued)

(51) Int. Cl.
*F02C 7/32* (2006.01)
*B64D 27/12* (2006.01)

(52) U.S. Cl.
CPC ................ *F02C 7/32* (2013.01); *B64D 27/12* (2013.01)

(58) Field of Classification Search
None
See application file for complete search history.

(56) References Cited

U.S. PATENT DOCUMENTS 4,505,124 A      3/1985   Mayer
4,550,573 A    11/1985   Rannenberg
(Continued)

FOREIGN PATENT DOCUMENTS

JP          S5932893 U      2/1984

OTHER PUBLICATIONS

Air transportation safety investigation A14Q0068, Bombardier Inc., Transportation Safety Board of Canada, May 29, 2014, 54 Pages.
(Continued)

*Primary Examiner* — David P. Olynick
(74) *Attorney, Agent, or Firm* — Dority & Manning, P.A.

(57) ABSTRACT

A gas turbine engine defines an axial direction and a radial direction and comprises a turbomachine having an unducted primary fan, a core engine a combustor casing enclosing a combustor and defining an outer surface, a core cowl surrounding at least a portion of the core engine. The outer surface of the core cowl defines a peak cowl diameter (D) in the radial direction, and the outer surface of the combustor casing defines a maximum combustor casing diameter (d) along the radial direction. The core engine defines an overall core axial length (L) along the axial direction and an under-core cowl axial length (L1) along the axial direction. The gas turbine engine defines a core cowl diameter ratio (CDR) equal to the peak cowl diameter (D) divided by the maximum combustor casing diameter (d) and a core cowl length ratio (CLR) equal to the under-core cowl axial length (L1) divided by the overall core axial length (L). The CDR is between 2.7 and 3.5 and the CLR is between 0.25 and 0.50.

20 Claims, 17 Drawing Sheets

Related U.S. Application Data application No. 17/972,720, filed on Oct. 25, 2022, now Pat. No. 12,104,539.

(56)                    References Cited

U.S. PATENT DOCUMENTS

| | | | |
|---|---|---|---|
| 5,414,992 | A | 5/1995 | Glickstein |
| 5,724,806 | A | 3/1998 | Horner |
| 6,182,435 | B1 | 2/2001 | Niggemann et al. |
| 6,250,097 | B1 | 6/2001 | Lui et al. |
| 6,415,595 | B1 | 7/2002 | Wilmot, Jr. et al. |
| 6,943,699 | B2 | 9/2005 | Ziarno |
| 7,010,906 | B2 | 3/2006 | Cazenave et al. |
| 7,260,926 | B2 | 8/2007 | Sabatino et al. |
| 7,882,704 | B2 | 2/2011 | Chen |
| 8,499,822 | B2 | 8/2013 | Bulin et al. |
| 8,522,572 | B2 | 9/2013 | Coffinberry et al. |
| 8,607,578 | B2 | 12/2013 | Fert |
| 8,944,367 | B2 | 2/2015 | Bystry, Jr. et al. |
| 8,961,114 | B2 | 2/2015 | Ruthemeyer |
| 8,984,884 | B2 | 3/2015 | Xu et al. |
| 9,259,808 | B2 | 2/2016 | Broughton et al. |
| 9,562,828 | B2 | 2/2017 | Broughton |
| 9,611,047 | B2 | 4/2017 | Kohn et al. |
| 9,677,501 | B2 | 6/2017 | Pierluissi et al. |
| 9,788,447 | B2 | 10/2017 | Dalton |
| 9,845,768 | B2 | 12/2017 | Pesyna et al. |
| 9,863,366 | B2 | 1/2018 | Froemming et al. |
| 10,167,814 | B2 | 1/2019 | Ferrier et al. |
| 10,190,506 | B2 | 1/2019 | Ruberte Sanchez |
| 10,260,419 | B2 | 4/2019 | Cerny et al. |
| 10,264,688 | B2 | 4/2019 | Richardson et al. |
| 10,787,996 | B2 | 9/2020 | Kupratis et al. |
| 11,066,179 | B2 | 7/2021 | Ramlaoui et al. |
| 2009/0188234 | A1 | 7/2009 | Suciu et al. |
| 2010/0212857 | A1 | 8/2010 | Bulin et al. |
| 2011/0000227 | A1 | 1/2011 | Kamiya |
| 2014/0000275 | A1 | 1/2014 | Kesseli et al. |
| 2014/0360153 | A1 | 12/2014 | Papa et al. |
| 2021/0301827 | A1 | 9/2021 | Stretton et al. |
| 2021/0310417 | A1 | 10/2021 | Hrubec et al. |
| 2022/0049911 | A1 | 2/2022 | Djelassi et al. |
| 2022/0055760 | A1 | 2/2022 | Schmitter et al. |

OTHER PUBLICATIONS

Analysis: The PW1100 GTF Engine and the Airbus A320NEO, Sahifa, Bangalore Aviation, Jan. 20, 2017, 9 Pages. Retrieved from: https://www.bangaloreaviation.com/2017/01/analysis-pw1100-gtf-engine-airbus-a320neo.html.

Atsushi et al., Development of PW1100G-JM Turbofan Engine, IHI Engineering Review, vol. 47, No. 1, 2014, 6 Pages.

Aviation Investigation—4 Docket Items—ENG19IA029, NTSB National Transportation Safety Board, Jan. 13, 2021, 85 Pages. Retrieved from: https://data.ntsb.gov/Docket/?NTSBNumber=ENG19IA029#.

Dorsey et al., Design Space Exploration of Future Open Rotor Configurations, AIAA 2020-3680, Cycle Performance and MDAO, 2020. (Abstract Only) Retrieved from: https://arc.aiaa.org/doi/10.2514/6.2020-3680.

"E00063EN", General Electric Company, U.S. Department of Transportation, Federal Aviation Administration Type Certification Data Sheet, Revision 8, Nov. 22, 2016, 12 Pages.

"E00070EN", General Electric Company, U.S. Department of Transportation, Federal Aviation Administration Type Certification Data Sheet, Revision 13, Jul. 14, 2021, 10 Pages.

"E00076EN", General Electric Company, U.S. Department of Transportation, Federal Aviation Administration Type Certification Data Sheet, Revision 21, Aug. 19, 2021, 22 Pages.

"E00087EN", General Electric Company, U.S. Department of Transportation, Federal Aviation Administration Type Certification Data Sheet, Revision 6, May 6, 2019, 9 Pages.

"E00088EN", General Electric Company, U.S. Department of Transportation, Federal Aviation Administration Type Certification Data Sheet, Revision 5, Nov. 4, 20191, 11 Pages.

"E00089EN", General Electric Company, U.S. Department of Transportation, Federal Aviation Administration Type Certification Data Sheet, Revision 7, Feb. 7, 2019, 17 Pages.

"E00090EN", General Electric Company, U.S. Department of Transportation, Federal Aviation Administration Type Certification Data Sheet, Revision 10, Jun. 2, 2022, 8 Pages.

"E00091EN", General Electric Company, U.S. Department of Transportation, Federal Aviation Administration Type Certification Data Sheet, Revision 2, Mar. 18, 2019, 9 Pages.

"E00095EN", General Electric Company, U.S. Department of Transportation, Federal Aviation Administration Type Certification Data Sheet, Revision 2, Apr. 2, 2021, 9 Pages.

Gliebe et al., Ultra-High Bypass Engine Aeroacoustic Study, NASA/CR-2003-212525, NASA, 2003, 109 pages.

Halliwell et al., Fuel Burn Benefits of a Variable-Pitch Geared Fan Engine, AIAA 2012-3912, 48th AIAA/ASME/SAE/ASEE Joint Propulsion Conference & Exhibit, Atlanta, GA. (Abstract Only) Retrieved from: https://arc.aiaa.org/doi/10.2514/6.2012-3912.

Jackson, Optimisation of Aero and Industrial Gas Turbine Design for the Environment, Thesis Cranfield University, 2009. (Abstract Only) Retrieved from http://hdl.handle.net/1826/4316.

Pratt and Whitney, PW1100G Geared Turbofan Engine, The Flying Engineer, Technically and Operationally Commercial Aviation, Nov. 26, 2013, 24 Pages. Retrieved from: https://theflyingengineer.com/flightdeck/pw1100g-gtf/.

GAS TURBINE ENGINE

CROSS-REFERENCE TO RELATED APPLICATIONS

This application is a continuation-in-part application of U.S. application Ser. No. 18/824,100, filed Sep. 4, 2024, which is a continuation of U.S. application Ser. No. 17/972, 720, filed Oct. 25, 2022, which issued as U.S. Pat. No. 12,104,539 on Oct. 1, 2024, all of which are hereby incorporated by reference in their entirety.

FIELD

The present disclosure relates to a gas turbine engine, such as an aeronautical gas turbine engine.

BACKGROUND

A gas turbine engine generally includes a turbomachine. The turbomachine includes several engine accessories such as controllers, pumps, heat exchangers and the like that are necessary for operation. These engine accessories and engine systems may be mounted to the turbomachine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
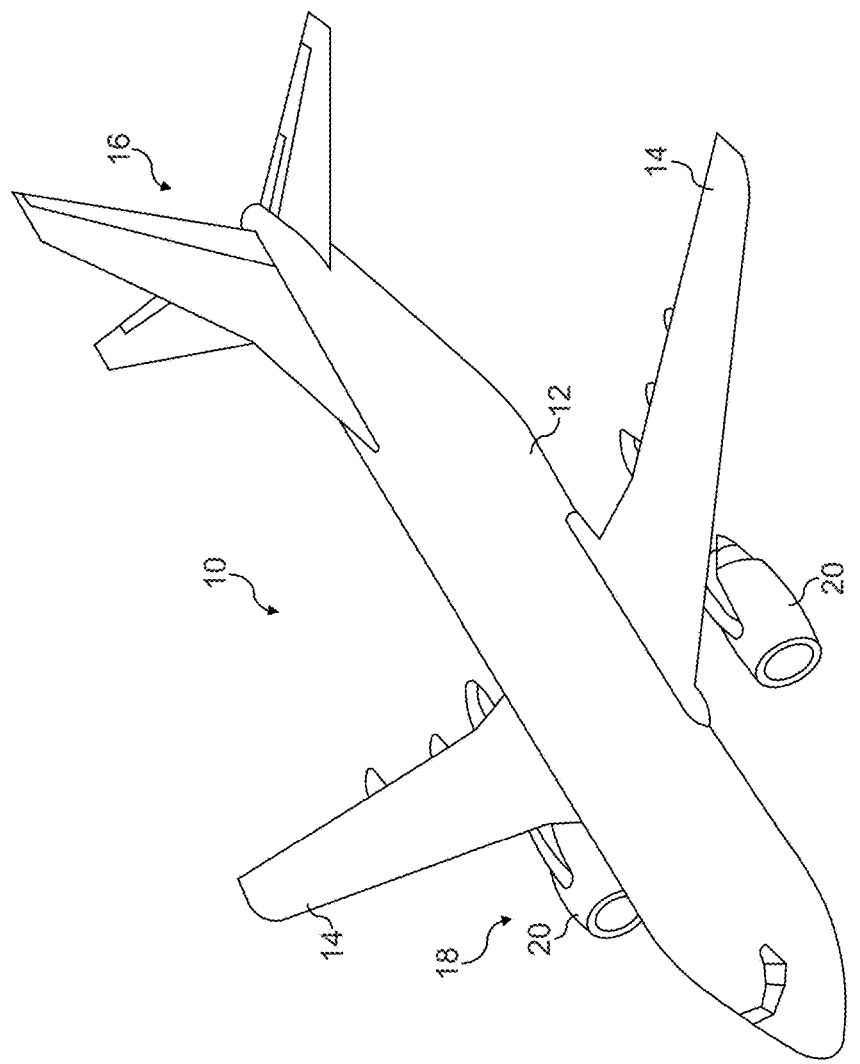
FIG. 1 is perspective view of an exemplary aircraft in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or aircraft and refer to the normal operational attitude of the gas turbine engine or aircraft. For example, with regards to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The term "cowl" includes a housing, casing, or other structure that at least partially encases or surrounds a portion of a turbomachine or gas turbine engine.

The phrases "from X to Y" and "between X and Y" each refers to a range of values inclusive of the endpoints (i.e., refers to a range of values that includes both X and Y).

The term "propulsive efficiency" refers to an efficiency with which the energy contained in an engine's fuel is converted into kinetic energy for the vehicle incorporating the engine, to accelerate it, or to replace losses due to aerodynamic drag or gravity.

As used herein, the term "rated speed" with reference to a gas turbine engine refers to a maximum rotational speed that the gas turbine engine may achieve while operating properly. For example, the gas turbine engine may be operating at the rated speed during maximum load operations, such as during takeoff operations.

The term "standard day operating condition" refers to ambient conditions of sea level altitude, 59 degrees Fahrenheit, and 60 percent relative humidity.

A "third stream" as used herein means a non-primary air stream capable of increasing fluid energy to produce a minority of total propulsion system thrust. A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, at a static flight speed, and/or at 86 degree Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

Conventional turbofan engine design practice has been to provide an outer nacelle surrounding the fan to provide relatively efficient thrust for the turbofan engine at high fan speeds (compared with an unducted fan). Such a configuration may generally limit a permissible size of the fan (i.e., a diameter of the fan). Generally, a turbofan engine includes a fan to provide a desired amount of thrust without overloading the fan blades (i.e., without increasing a disk loading of the fan blades of the fan beyond a certain threshold), and therefore to maintain a desired overall propulsive efficiency for the turbofan engine. The inventors of the present disclosure seek to drive the fan diameter higher, thereby to reduce fan pressure ratio while maintaining the same level of thrust to improve fuel efficiency. By increasing the fan diameter, however, an installation of the turbofan engine becomes more difficult. In addition, if an outer nacelle is maintained, the outer nacelle may become weight prohibitive with some larger diameter fans.

The inventors of the present disclosure found that for a three-stream gas turbine engine having an unducted primary fan (the outer nacelle removed) and a ducted secondary fan, with the secondary fan providing an airflow to a third stream of the gas turbine engine, an overall propulsive efficiency of the gas turbine engine that results from providing a high diameter fan may be maintained at a high level, while reducing the size of the primary fan. Such a configuration may maintain a desired overall propulsive efficiently for the gas turbine engine, or unexpectedly, may in fact increase the overall propulsive efficiency of the gas turbine engine. Further, by including a third stream, an axial length of the core engine may be reduced relative to the overall engine axial length by allowing for a portion of the airflow through the engine to flow through the third stream. This reduces an overall weight of the engine. However, the core engine must maintain a sufficient size to produce enough power to drive the primary fan and the ducted secondary fan.

Further, removing the outer nacelle and reducing the overall axial length of the core engine significantly reduces engine accessory storage space. A diameter of a core cowl may be increased to make room for the accessories between an engine casing and an inner surface of the core cowl, however, the core cowl diameter cannot be too large due to potential performance penalties such as excessive drag and installation difficulties.

The inventors proceeded in the manner of designing a gas turbine engine with a given core cowl diameter, core diameter, core axial length, and overall engine axial length; checking the propulsive efficiency of the designed gas turbine engine; redesigning the gas turbine engine with varying core cowl diameters, core diameters, core axial lengths, and overall engine axial lengths; rechecking the propulsive efficiency of the redesigned gas turbine engine; and then making accommodations when, for example, it was found that subsystem sizes increased due to certification requirements and/or power requirements, or servicing needs impacted where to locate things during the design of several different types of gas turbine engines, including the gas turbine engine described below with reference to, e.g., FIGS. 4 through 8.

During the course of this practice of studying and evaluating various cowl diameters, core diameters, core length, and engine length considered feasible for best satisfying mission requirements, it was discovered that certain relationships exist between a core cowl diameter ratio (which is equal to a peak cowl diameter divided by a maximum combustor casing diameter) and a core cowl length ratio (which is equal to an under-core cowl axial length divided by an overall core axial length). In particular, the inventors of the present disclosure have found that these ratios can be thought of as an indicator of the ability of a gas turbine engine to provide sufficient packaging space between the core engine combustor casing and the core cowl for packaging/mounting various accessories and/or engine systems, while also having a core engine capable of producing sufficient power to drive primary and secondary fans, particularly in more complex engine designs. In some embodiments, the inventors found that selectively coupling one or more engine components such as an engine accessory or system component to one of the core cowl or to the engine improves accessibility for inspection, repair, and maintenance and improves weigh loads on the core engine.

Referring now to the drawings, FIG. 1 is a perspective view of an exemplary aircraft 10 that may incorporate at least one exemplary embodiment of the present disclosure. As shown in FIG. 1, the aircraft 10 has a fuselage 12, wings 14 attached to the fuselage 12, and an empennage 16. The aircraft 10 further includes a propulsion system 18 that produces a propulsive thrust to propel the aircraft 10 in flight, during taxiing operations, etc. Although the propulsion system 18 is shown attached to the wing(s) 14, in other embodiments it may additionally or alternatively include one or more aspects coupled to other parts of the aircraft 10, such as, for example, the empennage 16, the fuselage 12, or both. The propulsion system 18 includes at least one engine. In the exemplary embodiment shown, the aircraft 10 includes a pair of gas turbine engines 20. Each gas turbine engine 20 is mounted to the aircraft 10 in an under-wing configuration. Each gas turbine engine 20 is capable of selectively generating a propulsive thrust for the aircraft 10. The gas turbine engines 20 may be configured to burn various forms of fuel including, but not limited to unless otherwise provided, jet fuel/aviation turbine fuel, and hydrogen fuel.

Figure 2:
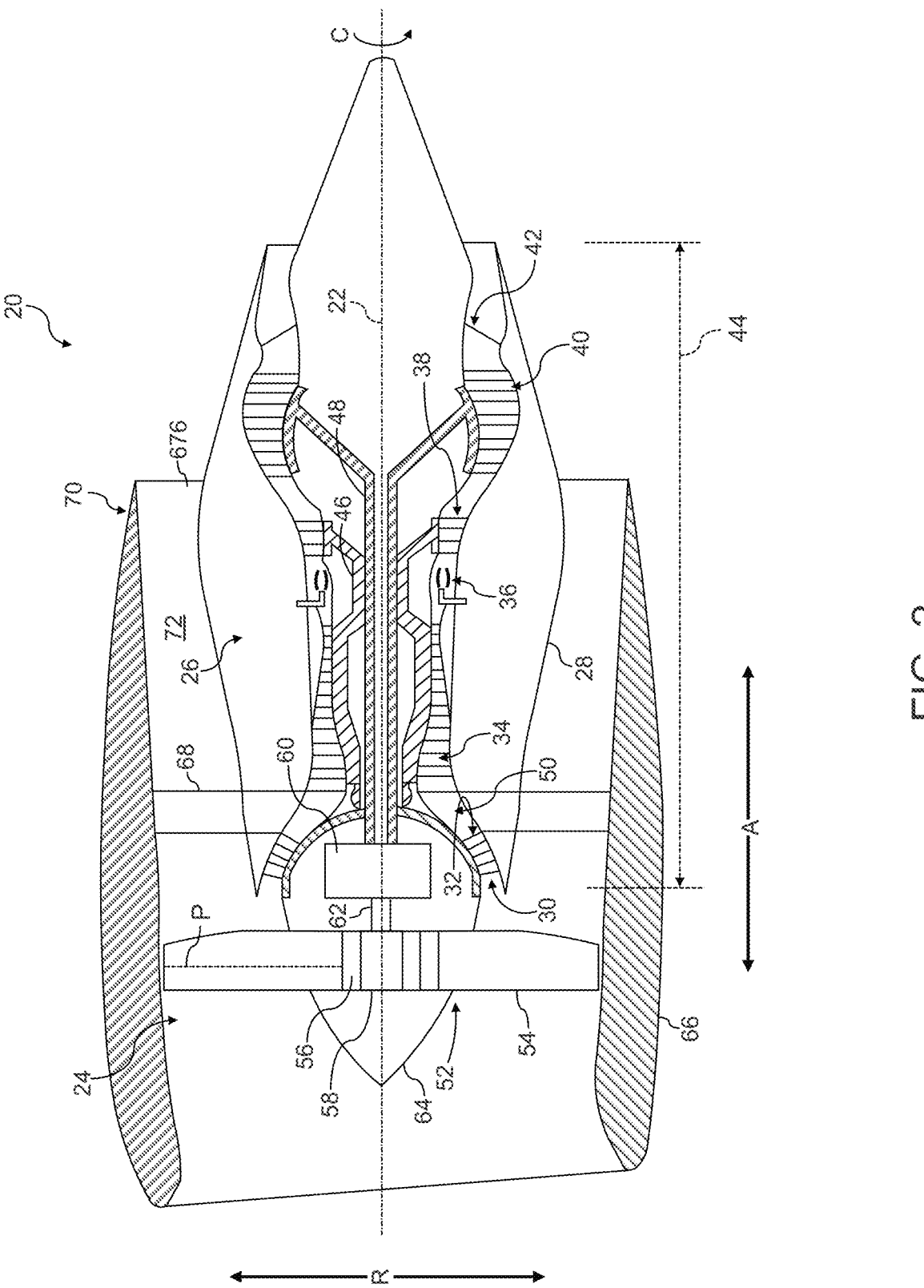
FIG. 2 is a schematic cross-sectional view of a ducted turbofan gas turbine engine in accordance with an exemplary embodiment of the present disclosure.

FIG. 2 is a cross-sectional side view of a gas turbine engine 20 in accordance with an exemplary embodiment of the present disclosure. More particularly, for the embodiment of FIG. 2, the gas turbine engine 20 is a multi-spool, high-bypass turbofan jet engine, sometimes also referred to as a "turbofan engine." As shown in FIG. 2, the gas turbine engine 20 defines an axial direction A (extending parallel to a longitudinal centerline 22 provided for reference), a radial direction R, and a circumferential direction C extending about the longitudinal centerline 22. In general, the gas turbine engine 20 includes a fan section 24 and a turbomachine 26 disposed downstream from the fan section 24.

The exemplary turbomachine 26 depicted generally includes an engine housing, casing, or core cowl 28 that defines an annular core inlet 30. The core cowl 28 at least partially encases, in serial flow relationship, a compressor section including a booster or low-pressure compressor 32 and a high-pressure compressor 34, a combustion section 36, a turbine section including a high-pressure turbine 38 and a low-pressure turbine 40, and at least a portion of a jet exhaust nozzle 42. Together, these components or sections make up a core engine 44 of the turbomachine 26.

A high-pressure shaft 46 drivingly connects the high-pressure turbine 38 to the high-pressure compressor 34. A low-pressure shaft 48 drivingly connects the low-pressure turbine 40 to the low-pressure compressor 32. The compressor section, combustion section 36, turbine section, and jet exhaust nozzle 42 together define a working gas flow path 50 through the gas turbine engine 20.

For the embodiment depicted, the fan section 24 includes a fan 52 having a plurality of fan blades 54 coupled to a disk 56 in a spaced apart manner. As depicted, the fan blades 54 extend outwardly from disk 56 generally along the radial direction R. Each fan blade 54 is rotatable with the disk 56 about a pitch axis P by virtue of the fan blades 54 being operatively coupled to a suitable pitch change mechanism 58 configured to collectively vary the pitch of the fan blades 54, e.g., in unison. The fan blades 54, disk 56, and pitch change mechanism 58 are together rotatable about the longitudinal centerline 22 by the low-pressure shaft 48.

In an exemplary embodiment, as shown in FIG. 2, the gas turbine engine 20 further includes a power gearbox or gearbox 60. The gearbox 60 includes a plurality of gears for adjusting a rotational speed of the fan 52 relative to a rotational speed of the low-pressure shaft 48, such that the fan 52 and the low-pressure shaft 48 may rotate at more efficient relative speeds. The gearbox 60 may be any type of gearbox suitable to facilitate coupling the low-pressure shaft 48 to the fan 52 while allowing each of the low-pressure turbine 40 and the fan 52 to operate at a desired speed. For example, in some embodiments, the gearbox 60 may be a reduction gearbox. Utilizing a reduction gearbox may enable the comparatively higher speed operation of the low-pressure turbine 40 while maintaining fan speeds sufficient to provide for increased air bypass ratios, thereby allowing for efficient operation of the gas turbine engine 20. Moreover, utilizing a reduction gearbox may allow for a reduction in turbine stages that would otherwise be present (e.g., in direct drive engine configurations), thereby providing a reduction in weight and complexity of the engine.

Referring still to the exemplary embodiment of FIG. 2, the disk 56 is connected to the gearbox 60 via a fan shaft 62. The disk 56 is covered by a rotatable front hub 64 of the fan section 24 (sometimes also referred to as a "spinner"). The front hub 64 is aerodynamically contoured to promote an airflow through the plurality of fan blades 54. Additionally, the exemplary fan section 24 includes an annular fan casing or outer nacelle 66 that circumferentially surrounds the fan 52 and/or at least a portion of the turbomachine 26. The nacelle 66 is supported relative to the turbomachine 26 by a plurality of circumferentially spaced struts or outlet guide vanes 68 in the embodiment depicted. Moreover, a downstream section 70 of the nacelle 66 extends over an outer portion of the turbomachine 26 to define a bypass airflow passage 72 therebetween.

Figure 3:
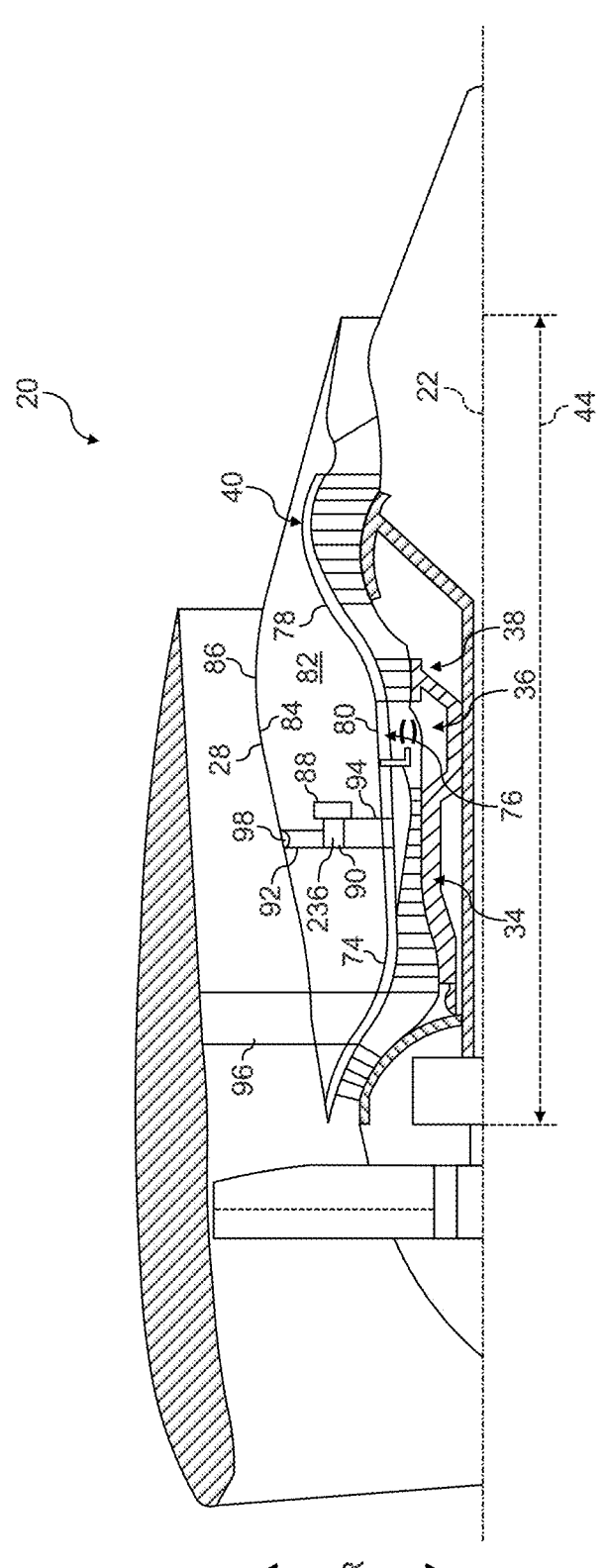
FIG. 3 is a schematic cross-sectional view of a portion of the ducted turbofan gas turbine engine shown in FIG. 2, in accordance with an exemplary embodiment of the present disclosure.

FIG. 3 is a schematic cross-sectional view of a portion of the core engine 44 of the gas turbine engine 20 as shown in FIG. 2, according to an exemplary embodiment of the present disclosure. As shown in FIG. 3, the high-pressure compressor 34 is encased within a compressor casing 74. The combustion section 36 is encased within a combustor casing 76. The high-pressure turbine 38 and the low-pressure turbine 40 are encased within one or more turbine casing(s) 78. The combustor casing 76 defines an outer surface 80. A void or space 82 is defined between an inner surface 84 of the core cowl 28 and the outer surface 80 of the combustor casing 76. The core cowl 28 further includes an outer surface 86 radially spaced from the inner surface 84 with respect to radial direction R. In exemplary embodiments, at least one engine component 88 is coupled to the core cowl 28 inner surface 84. The at least one engine component 88 may include but is not limited to valves, electronics including engine and system controllers, fire and overheat detection system components, fire extinguisher components, heat exchangers, pumps, generator, etc.

In exemplary embodiments, engine component 88 is selectively coupled to the core engine 44 or the core cowl 28. When the engine component 88 is coupled to the core cowl 28, the engine component 88 travels with the core cowl 28 when pivoted away from the core engine 44. When the engine component 88 is coupled to the core engine 44, the engine component 88 stays coupled to the core engine 44 when the core cowl 28 is pivoted away from the core engine 44. In exemplary embodiments and as previously presented, the engine component 88 is one of a heat exchanger, a sensor, a controller, a pump, a duct, a valve, fire and overheat detection system components, fire extinguisher components, or a generator. It should be appreciated that this list is not all inclusive of possible engine components that may be selectively coupled to the core cowl 28 or the core engine 44.

In exemplary embodiments, the engine component 88 is selectively coupled to the core engine 44 or the core cowl 28 via a fastener 90. As shown in FIG. 3, the fastener 90 may be disposed between a core cowl structure 92 such as a strut or bracket, and a core engine structure 94 such as a strut, a casing or bracket. The core cowl structure 92 may be fixedly coupled to the core cowl 28, such that the core cowl structure 92 moves with the core cowl 28, as described below. By contrast, the core engine structure 94 is not moveable with the core cowl 28 and instead may be fixedly coupled to a stationary and structural component of the core engine 44, such as the compressor casing 74 (as in the embodiment depicted), or one or more of the combustor casing 76, turbine casing 78, or a support frame such as a compressor frame 96, a mid-frame, or a rear support frame or turbine frame, etc.

The fastener 90 may be fixedly connected to the engine component 88. The fastener 90 may comprise a cam lock type fitting, bayonet fitting, quarter-turn fastener or other mechanical or electromechanical fastener or device that allows selectively coupling the engine component 88 to the core cowl 28 or the core engine 44. In particular embodiments, the core cowl 28 defines or includes an access opening or hatch 98 wherein the fastener 90 is accessible from the access opening 98.

Figure 4:
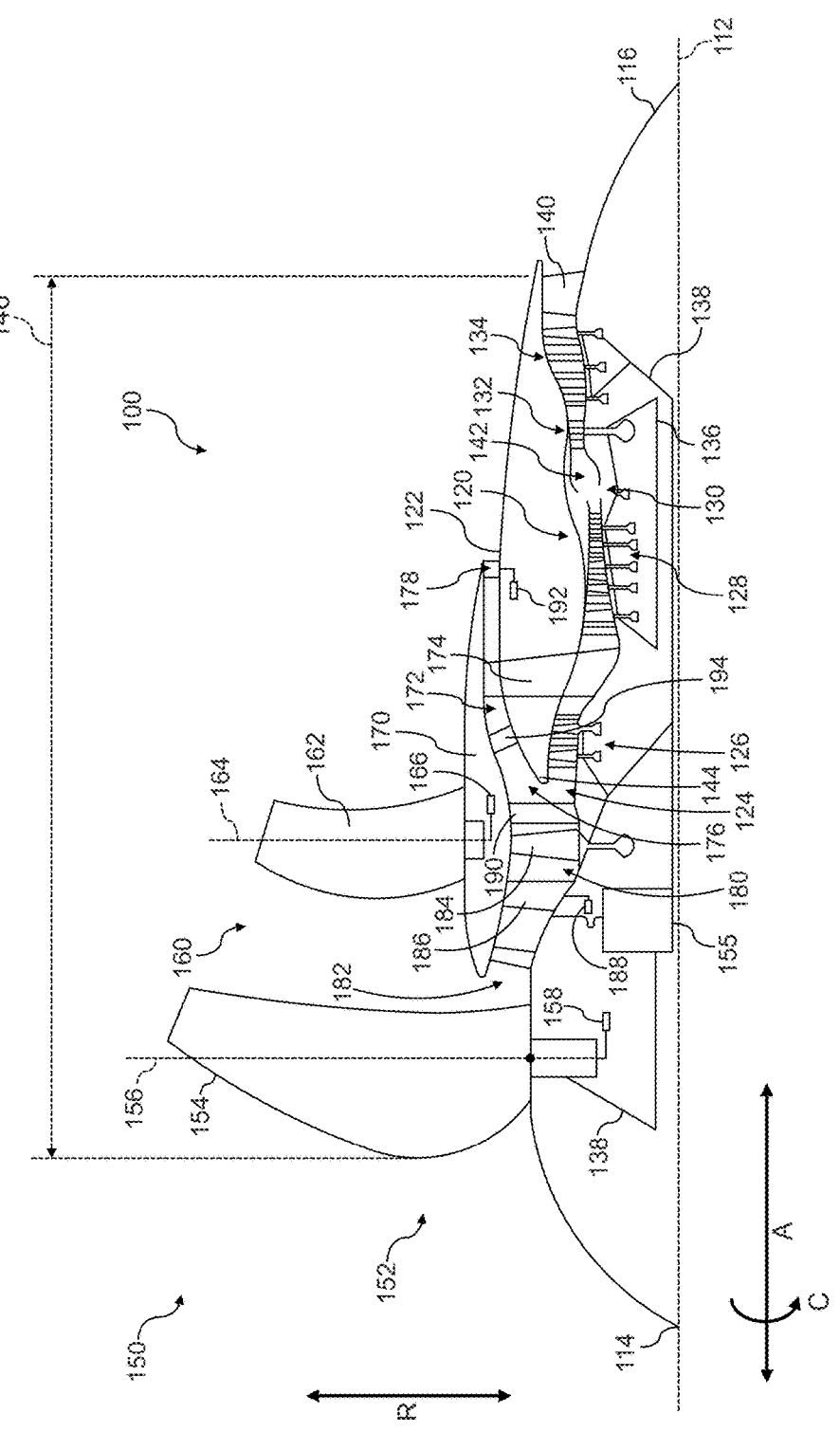
FIG. 4 is a schematic cross-sectional view of a three-stream engine in accordance with an exemplary embodiment of the present disclosure.

It should be appreciated, however, that the exemplary gas turbine engine 20 depicted in FIGS. 2 and 3 is provided by way of example only, and that in other exemplary embodiments, the gas turbine engine 20 may have other configurations. For example, FIG. 4 is a schematic cross-sectional view of a gas turbine engine 100 according to another example embodiment of the present disclosure. Particularly, FIG. 4 provides a turbofan engine having a rotor assembly with a single stage of unducted rotor blades. In such a manner, the rotor assembly may be referred to herein as an "unducted fan," or the entire engine 100 may be referred to as an "unducted turbofan engine." In addition, the engine 100 of FIG. 4 includes a third stream extending from the compressor section to a rotor assembly flowpath over the turbomachine, as will be explained in more detail below.

For reference, the engine 100 defines an axial direction A, a radial direction R, and a circumferential direction C. Moreover, the engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The engine 100 extends between a forward end 114 and an aft end 116, e.g., along the axial direction A.

As shown in FIG. 4 the engine 100 includes a turbomachine 120 having a fan section 150 that is positioned upstream thereof. Generally, the turbomachine 120 includes, in serial flow order, a compressor section, a combustion section, a turbine section, and an exhaust section. Particularly, as shown in FIG. 4, the turbomachine 120 includes a housing or core cowl 122 that defines an annular core inlet 124. The core cowl 122 further encloses at least in part a low-pressure system and a high-pressure system. For example, the core cowl 122 depicted encloses and supports at least in part a booster or low-pressure ("LP") compressor 126 for pressurizing the air that enters the turbomachine 120 through core inlet 124. A high-pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air.

It will be appreciated that as used herein, the terms "high/low speed" and "high/low-pressure" are used with respect to the high-pressure/high speed system and low-pressure/low speed system interchangeably. Further, it will be appreciated that the terms "high" and "low" are used in this same context to distinguish the two systems and are not meant to imply any absolute speed and/or pressure values.

The high energy combustion products flow from the combustor 130 downstream to a high-pressure turbine 132. The high-pressure turbine 132 drives the high-pressure compressor 128 through a high-pressure shaft 136. In this regard, the high-pressure turbine 132 is drivingly coupled with the high-pressure compressor 128. The high energy combustion products then flow to a low-pressure turbine 134. The low-pressure turbine 134 drives the low-pressure compressor 126 and components of the fan section 150 through a low-pressure shaft 138. In this regard, the low-pressure turbine 134 is drivingly coupled with the low-pressure compressor 126 and components of the fan section 150. The low-pressure shaft 138 is coaxial with the high-pressure shaft 136 in this example embodiment. After driving each of the high-pressure turbine 132 and the low-pressure turbine 134, the combustion products exit the turbomachine 120 through a rear support frame or turbomachine exhaust nozzle 140. A core engine 146 of the gas turbine engine 100 is defined as the part of the gas turbine engine 100 that extends from the fan section 150 to the rear support frame or turbomachine exhaust nozzle 140.

Accordingly, the turbomachine 120 defines a working gas flowpath or core duct 142 that extends between the core inlet 124 and the rear support frame or turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream. The fan section 150 includes a fan 152, which is the primary fan in this example embodiment. For the depicted embodiment of FIG. 4, the fan 152 is an open rotor or unducted fan 152. In such a manner, the engine 100 may be referred to as an open rotor engine. Moreover, it will be appreciated that the fan section 150 includes a single fan 152, and the fan 152 is the only unducted fan of the gas turbine engine 10 depicted.

As depicted, the fan 152 includes a plurality or an array of fan blades 154 (only one shown in FIG. 4). The fan blades 154 are rotatable, e.g., about the longitudinal axis 112. As noted above, the fan 152 is drivingly coupled with the low-pressure turbine 134 via the low-pressure shaft 138. For the embodiments shown in FIG. 1, the fan 152 is coupled with the low-pressure shaft 138 via a speed reduction gearbox 155, e.g., in an indirect-drive or geared-drive configuration.

Moreover, the array of fan blades 154 can be arranged in equal spacing around the longitudinal axis 112. Each fan blade 154 has a root and a tip and a span defined therebetween. Each fan blade 154 defines a central blade axis 156. For this embodiment, each fan blade 154 of the fan 152 is rotatable about its central blade axis 156, e.g., in unison with one another. One or more actuators 158 are provided to facilitate such rotation and therefore may be used to change a pitch of the fan blades 154 about their respective central blades' axes 156.

The fan section 150 further includes a fan guide vane array 160 that includes fan guide vanes 162 (only one shown in FIG. 4) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 4 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about its respective central blade axis 164, e.g., in unison with one another. One or more actuators 166 are provided to facilitate such rotation and therefore may be used to change a pitch of the fan guide vane 162 about its respective central blade axis 164. However, in other embodiments, each fan guide vane 162 may be fixed or unable to be pitched about its central blade axis 164. The fan guide vanes 162 are mounted to a fan housing or fan cowl 170.

As shown in FIG. 4, in addition to the fan 152, which is unducted, a ducted fan 184 is included aft of the fan 152, such that the engine 100 includes both a ducted and an unducted fan which both serve to generate thrust through the movement of air without passage through at least a portion of the turbomachine 120 (e.g., without passage through the HP compressor 128 and combustion section for the embodiment depicted). The ducted fan 184 is rotatable about the same axis (e.g., the longitudinal axis 112) as the fan blade 154. The ducted fan 184 is, for the embodiment depicted, driven by the low-pressure turbine 134 (e.g., coupled to the low-pressure shaft 138). In the embodiment depicted, as noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 4) arranged in a single stage, such that the ducted fan 184 may be referred to as a single stage fan. The fan blades of the ducted fan 184 can be arranged in equal circumferential spacing around the longitudinal axis 112. Each blade of the ducted fan 184 has a root and a tip and a span defined therebetween.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or simply a fan duct 172. According to this embodiment, the fan flowpath or fan duct 172 may be understood as forming at least a portion of the third stream of the engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially extending and circumferentially spaced stationary struts 174 (only one shown in FIG. 4).

The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl 122.

The exemplary engine 100 shown in FIG. 4 also defines or includes an inlet duct 180. The inlet duct 180 extends between the engine inlet 182 and the core inlet 124 and fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a fan duct splitter or the leading edge 144 of the core cowl 122. In the embodiment depicted, the inlet duct 180 is wider than the core duct 142 along the radial direction R. The inlet duct 180 is also wider than the fan duct 172 along the radial direction R.

Notably, for the embodiment depicted, the engine 100 includes one or more features to increase an efficiency of a third-stream thrust, Fn3S (e.g., a thrust generated by an airflow through the fan duct 172 exiting through the fan exhaust nozzle 178, generated at least in part by the ducted fan 184). In particular, the engine 100 further includes an array of inlet guide vanes 186 positioned in the inlet duct 180 upstream of the ducted fan 184 and downstream of the engine inlet 182. The array of inlet guide vanes 186 are arranged around the longitudinal axis 112. For this embodiment, the inlet guide vanes 186 are not rotatable about the longitudinal axis 112.

Each inlet guide vanes 186 defines a central blade axis (not labeled for clarity), and is rotatable about its respective central blade axis, e.g., in unison with one another. In such a manner, the inlet guide vanes 186 may be considered a variable geometry component. One or more actuators 188 are provided to facilitate such rotation and therefore may be used to change a pitch of the inlet guide vanes 186 about their respective central blade axes. However, in other embodiments, each inlet guide vanes 186 may be fixed or unable to be pitched about its central blade axis.

Further, located downstream of the ducted fan 184 and upstream of the fan duct inlet 176, the engine 100 includes an array of outlet guide vanes 190. As with the array of inlet guide vanes 186, the array of outlet guide vanes 190 are not rotatable about the longitudinal axis 112. However, for the embodiment depicted, unlike the array of inlet guide vanes 186, the array of outlet guide vanes 190 are configured as fixed-pitch outlet guide vanes.

Further, it will be appreciated that for the embodiment depicted, the fan exhaust nozzle 178 of the fan duct 172 is further configured as a variable geometry exhaust nozzle. In such a manner, the engine 100 includes one or more actuators 192 for modulating the variable geometry exhaust nozzle. For example, the variable geometry exhaust nozzle may be configured to vary a total cross-sectional area (e.g., an area of the nozzle in a plane perpendicular to the longitudinal axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

The combination of the array of inlet guide vanes 186 located upstream of the ducted fan 184, the array of outlet guide vanes 190 located downstream of the ducted fan 184, and the fan exhaust nozzle 178 may result in a more efficient generation of third-stream thrust, Fn3S, during one or more engine operating conditions. Further, by introducing a variability in the geometry of the inlet guide vanes 186 and the fan exhaust nozzle 178, the engine 100 may be capable of generating more efficient third-stream thrust, Fn3S, across a relatively wide array of engine operating conditions, including takeoff and climb (where a maximum total engine thrust FnTotal, is generally needed) as well as cruise (where a lesser amount of total engine thrust, FnTotal, is generally needed).

Moreover, referring still to FIG. 4, in exemplary embodiments, air passing through the fan duct 172 may be relatively cooler (e.g., lower temperature) than one or more fluids utilized in the turbomachine 120. In this way, one or more heat exchangers 194 may be positioned in thermal communication with the fan duct 172. For example, one or more heat exchangers 194 may be disposed within the fan duct 172 and utilized to cool one or more fluids from the core engine 146 with the air passing through the fan duct 172, as a resource for removing heat from a fluid, e.g., compressor bleed air, oil or fuel.

Although not depicted in detail, the heat exchanger 194 may be an annular heat exchanger extending substantially 360 degrees in the fan duct 172 (e.g., at least 300 degrees, such as at least 330 degrees). In such a manner, the heat exchanger 194 may effectively utilize the air passing through the fan duct 172 to cool one or more systems of the engine 100 (e.g., lubrication oil systems, compressor bleed air, electrical components, etc.). The heat exchanger 194 uses the air passing through duct 172 as a heat sink and correspondingly increases the temperature of the air downstream of the heat exchanger 194 and exiting the fan exhaust nozzle 178.

Figure 5:
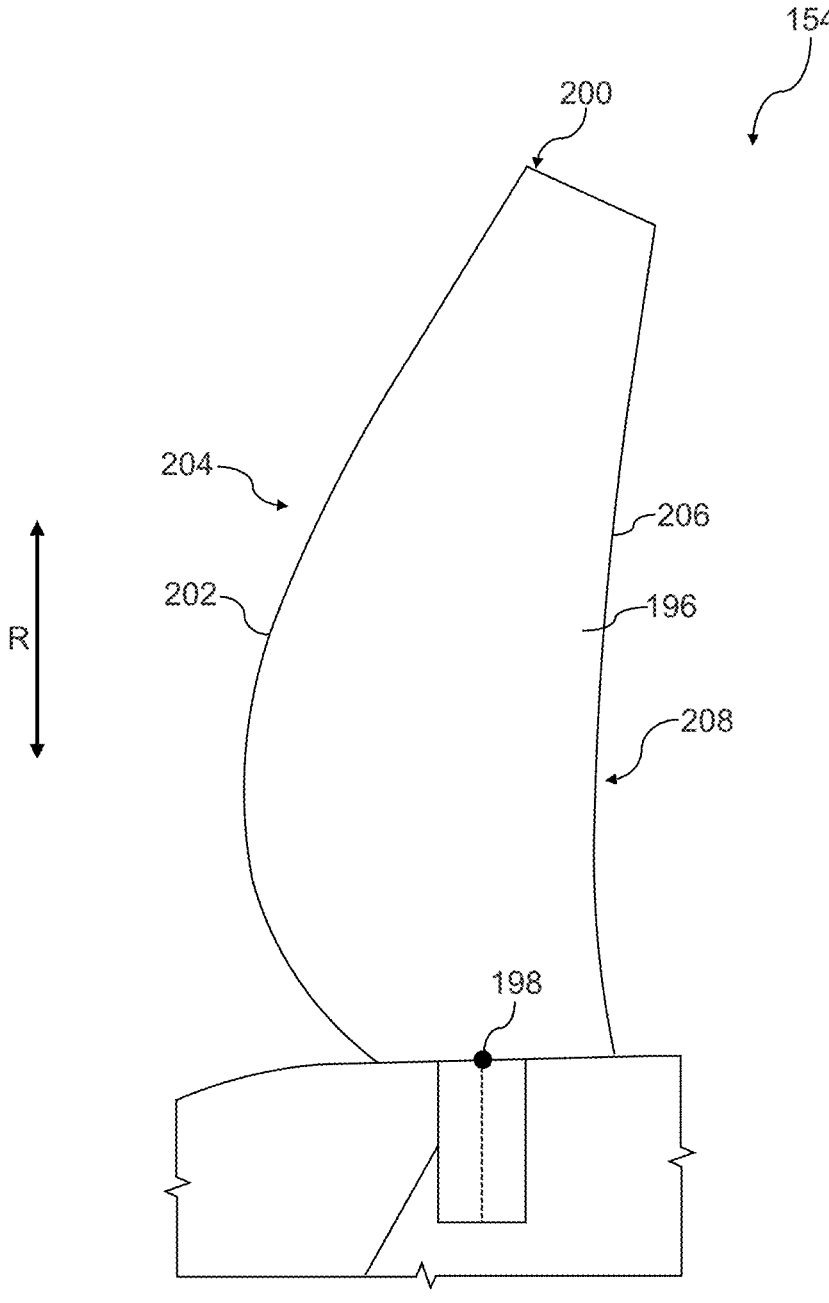
FIG. 5 is an enlarged view of an exemplary fan blade according to exemplary embodiments of the present disclosure.

FIG. 5 is an enlarged view of an exemplary fan blade 154 of the plurality or array of fan blades 154 as shown in FIG. 4, according to exemplary embodiments of the present disclosure. As previously presented, each fan blade 154 has an airfoil or blade body 196. The blade body 196 spans in the radial direction R between a root 198 and a tip 200 of the blade body 196. The blade body 196 includes a leading edge 202 that extends along the span between the root 198 and the tip 200 along an upstream or forward portion 204 of the fan blade 154. The blade body 196 further includes a trailing edge 206 that extends along the span between the root 198 and the tip 200 along a downstream or aft portion 208 of the fan blade 154.

Figure 6:
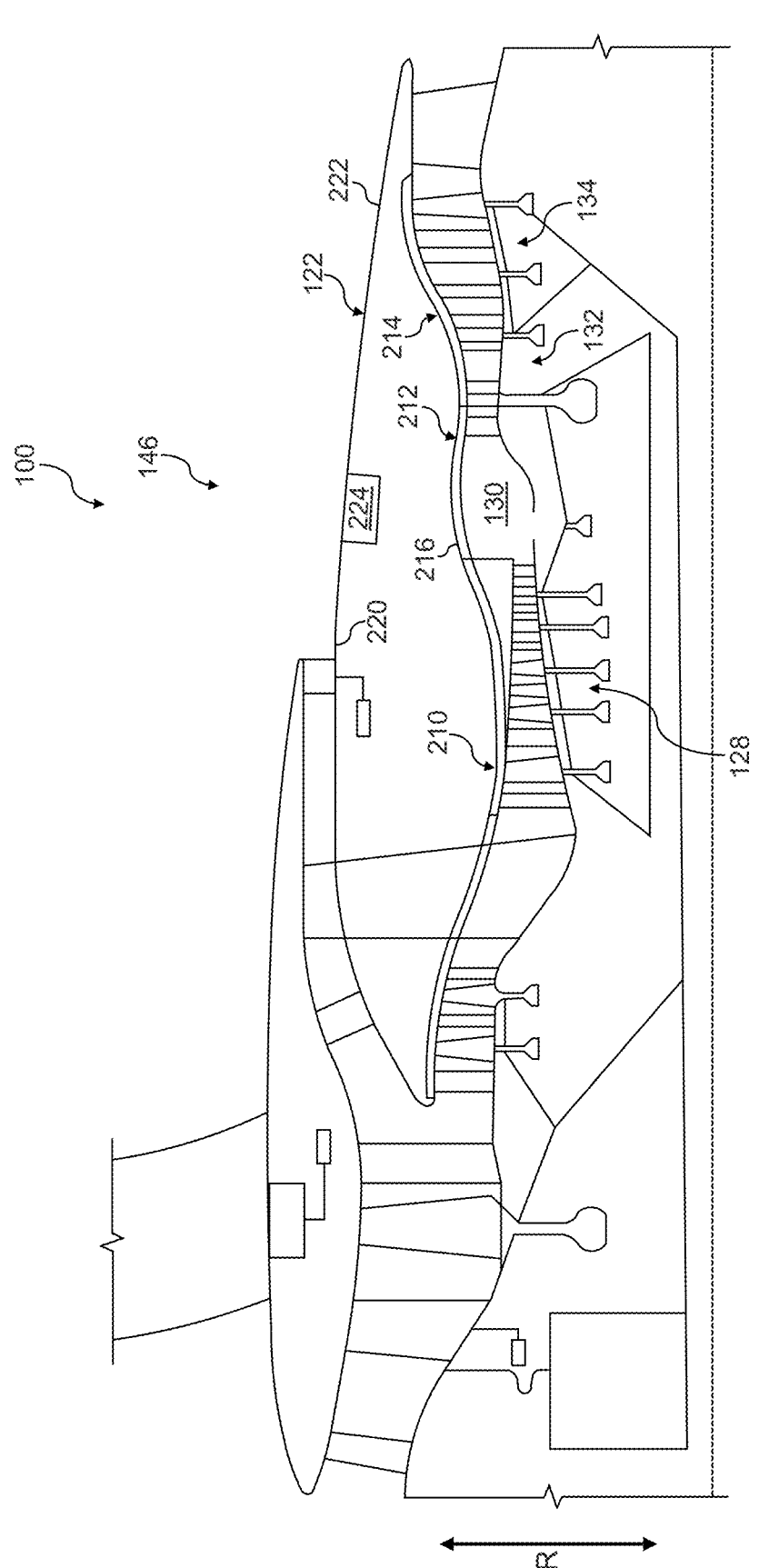
FIG. 6 is a schematic cross-sectional view of a portion of a core engine of the gas turbine engine as shown in FIG. 4, according to an exemplary embodiment of the present disclosure.

FIG. 6 is a schematic cross-sectional view of a portion of the core engine 146 of the gas turbine engine 100 as shown in FIG. 4, according to an exemplary embodiment of the present disclosure. As shown in FIG. 6, the high-pressure compressor 128 is encased within a compressor casing 210. The combustor 130 is encased within a combustor casing 212. The high-pressure turbine 132 and the low-pressure turbine 134 are encased within one or more turbine casing(s) 214. The combustor casing 212 defines an outer surface 216. A void or space 218 is defined between an inner surface 220 of the core cowl 122 and the outer surface 216 of the combustor casing 212. The core cowl 122 further includes an outer surface 222 radially spaced from the inner surface 220 with respect to radial direction R. In exemplary embodiments, at least one engine component 224 is attached to the core cowl 122 inner surface 220. The at least one engine component 224 may include but is not limited to valves, electronics including engine and system controllers, fire and overheat detection system components, fire extinguisher components, heat exchangers, pumps, generator, etc.

Figure 7:
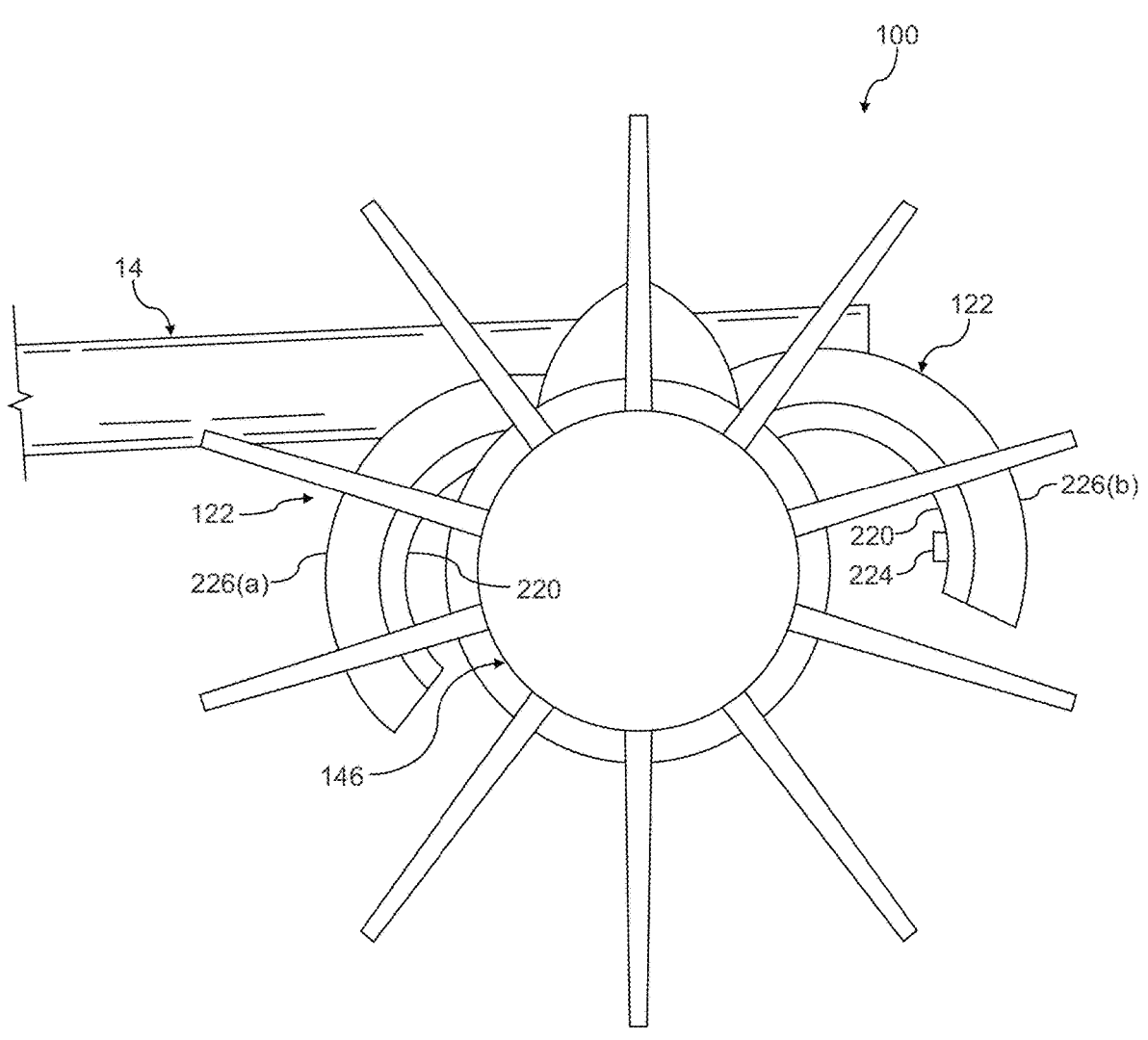
FIG. 7 is a front view of a portion of the gas turbine engine as shown in FIGS. 4 and 6, mounted to a portion of an exemplary wing according to exemplary embodiments of the present disclosure.

FIG. 7 is a front view of a portion of the gas turbine engine 100 as shown in FIGS. 4 and 6, mounted to a portion of an exemplary wing 14 according to exemplary embodiments of the present disclosure. It should be noted that fan section 150 (shown in FIG. 4) is not shown in FIG. 7 for clarity. As shown in FIG. 7, the core cowl 122 is formed from at least two shells 226(*a*), 226(*b*). It should be appreciated that the core cowl 122 shown in FIG. 7 may also be representative of the core cowl 28 shown in FIGS. 2 and 3. The shells 226(*a*), 226(*b*) are pivotally mounted to the gas turbine engine 100 to allow the shells 226(*a*), 226(*b*) to swing upward and away from the core engine 146, thereby exposing several engine accessories and systems of the core engine 146 such as engine component 224 or engine component 88 from FIG. 3, for inspection, repair, and maintenance. The shells 226(*a*), 226(*b*) are shown in FIG. 7 in an at least partially open state. When coupled to the inner surface 220 of the core cowl 122, the one or more engine accessories or engine systems will move with the core cowl 122 when the shells 226(*a*) and 226(*b*) are moved between open and closed positions.

Figure 8:
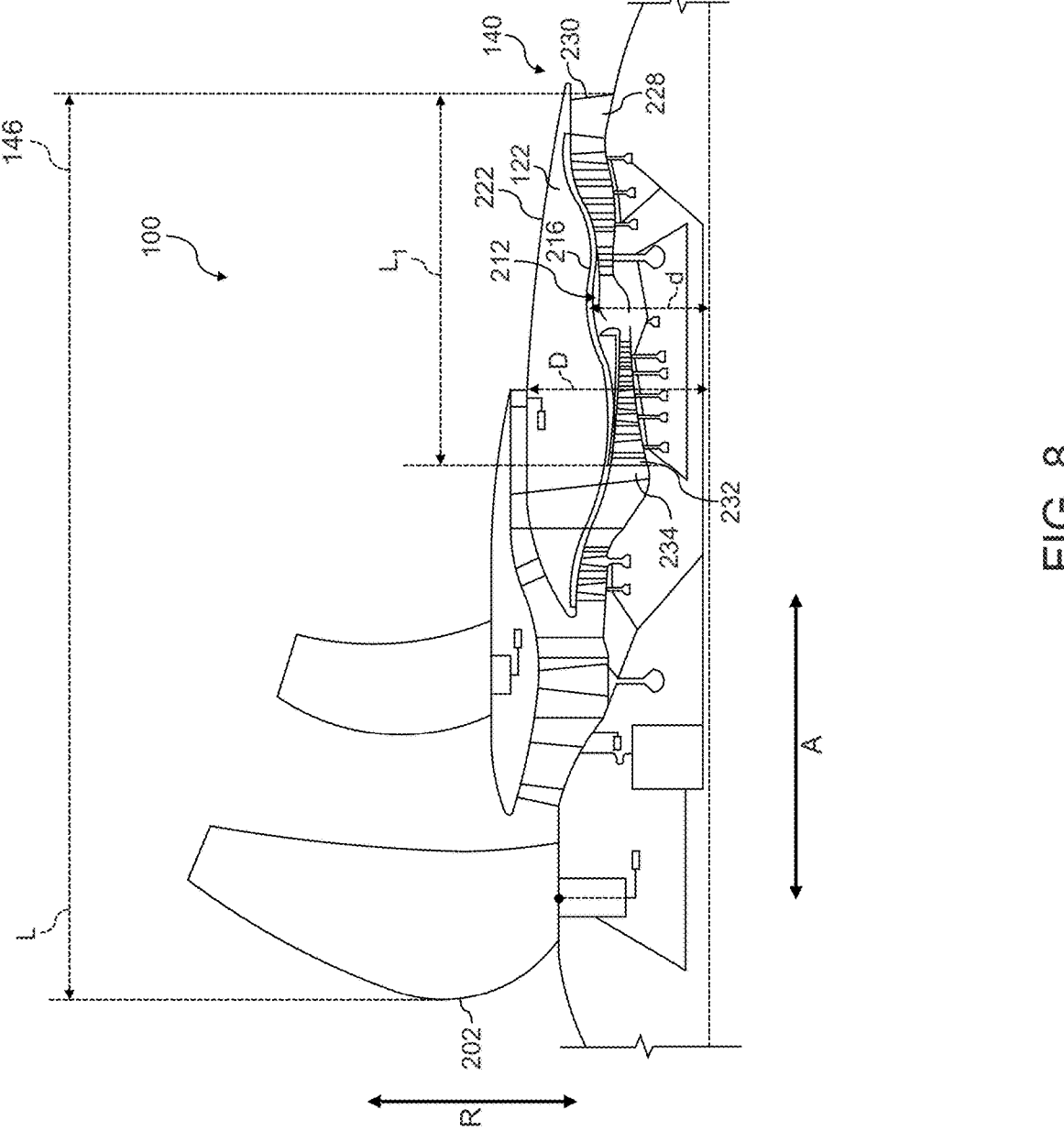
FIG. 8 is a schematic cross-sectional view of the gas turbine engine as shown in FIG. 4, according to an exemplary embodiment of the present disclosure.

FIG. 8 is a schematic cross-sectional view of the gas turbine engine 100 as shown in FIG. 4, according to an exemplary embodiment of the present disclosure. As shown in FIG. 8 the outer surface 222 of the core cowl 122 defines a peak cowl diameter (D) in the radial direction R with respect to axial centerline 112. The outer surface 216 of the combustor casing 212 defines a maximum combustor casing diameter (d) along the radial direction R with respect to axial centerline 112. The core engine 146 defines an overall core axial length (L) along the axial direction A with respect to axial centerline 112. An under-core cowl axial length (L1) is defined along the axial direction A with respect to axial centerline 112.

In exemplary embodiments, as shown in FIG. 8, the turbomachine rear support frame or exhaust nozzle 140 includes a strut 228 having a trailing edge 230 within a working gas flowpath of the gas turbine engine 100. The overall core axial length (L) is measured from a forward-most portion of the leading edge 202 of a respective primary fan blade 154 to an aft-most portion of the trailing edge 230 of the strut 228. The gas turbine engine 100 further includes a high-pressure compressor inlet guide vane 232 having a leading edge 234 where the under-core cowl axial length (L1) along the axial direction is measured from the leading edge 234 of the high-pressure compressor inlet guide vane 232 to the trailing edge of the strut 228.

Figure 9:
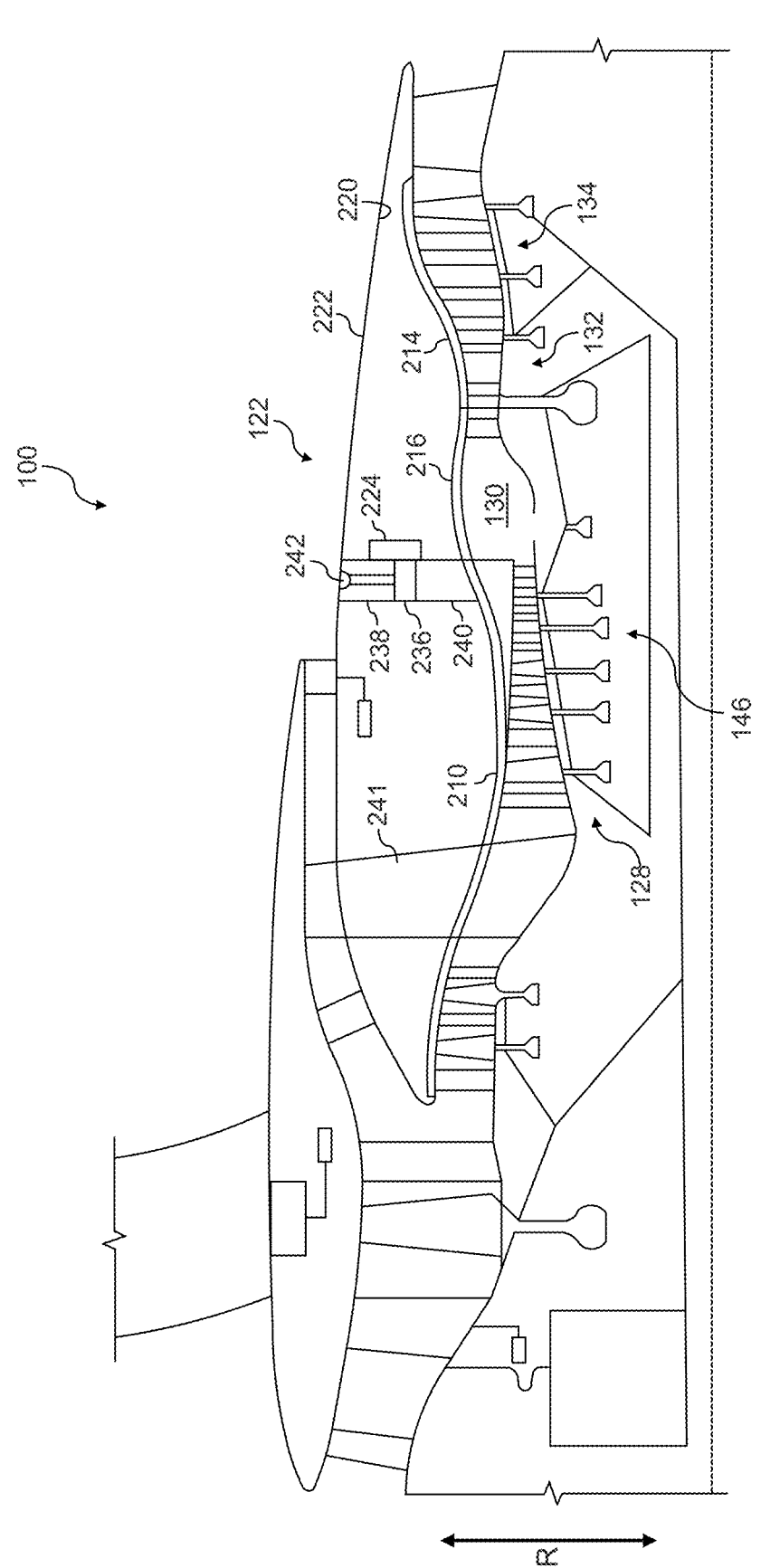
FIG. 9 is a schematic cross-sectional view of the gas turbine engine as shown in FIG. 4, according to an exemplary embodiment of the present disclosure.

FIG. 9 is a schematic cross-sectional view of the gas turbine engine 100 as shown in FIG. 4, according to an exemplary embodiment of the present disclosure. In exemplary embodiments, engine component 224 is selectively coupled to the core engine 146 or the core cowl 122. When the engine component 224 is coupled to the core cowl 122, the engine component 224 travels with the core cowl 122 when pivoted away from the core engine 146. When the engine component 224 is coupled to the core engine 146, the engine component 224 stays coupled to the core engine 146 when the core cowl 122 is pivoted away from the core engine 146. In exemplary embodiments and as previously presented, the engine component 224 is one of a heat exchanger, a sensor, a controller, a pump, a duct, a valve, fire and overheat detection system components, fire extinguisher components, or a generator. It should be appreciated that this list is not all inclusive of possible engine components that may be selectively coupled to the core cowl 122 or the core engine 146.

In particular, it will be appreciated that in at least certain exemplary embodiments, the engine component 224 may be the controller, such as an engine controller, such as a full authority digital engine control ("FADEC") controller. As will be appreciated, the gas turbine engine 100 depicted includes an unducted fan (see, e.g., unducted fan 152 in FIG. 4). In such a manner, the gas turbine engine 100 does not include a nacelle surrounding the fan (see, e.g., nacelle 66 surrounding fan 52 in FIG. 2). Without the nacelle, the engine controller may need to be located within the core cowl 122 of the gas turbine engine 100. As will further be appreciated, however, the environment within the core cowl 122 may be much hotter than within a nacelle, particularly closer to the turbomachinery components (e.g., the HP compressor, combustor, and HP turbine). Accordingly, positioning the engine controller outwardly along the radial direction R from the turbomachinery components and, e.g., selectively coupled to the core cowl 122 may reduce a temperature of the engine controller during operation of the gas turbine engine 100 to maintain a temperature of the engine controller below a maximum threshold for the electronics of the engine controller (e.g., below 200 degrees Fahrenheit), and allow for positioning of the engine controller within the core cowl 122. Briefly, a ratio of the peak cowl diameter (D) in the radial direction R and maximum combustor casing diameter (d) along the radial direction R may further facilitate such a positioning of the engine controller.

It should be appreciated, however, that in other embodiments, the engine component 224 may additionally or alternatively be any other suitable component traditionally found within a nacelle of a ducted gas turbine engine, such as a lubrication oil tank, a lubrication oil pump, power electronics (e.g., inverters), electric machines, etc. Moreover, although the engine controller is described as being positioned within the core cowl 122 above, in other embodiments, the engine controller and/or one or more other suitable components traditionally found within a nacelle of a ducted gas turbine engine may be positioned within a pylon used to mount the gas turbine engine to an aircraft (such as to a wing or fuselage of the aircraft).

In exemplary embodiments, the engine component 224 is selectively coupled to the core engine 146 or the core cowl 122 via a fastener 236. As shown in FIG. 9, the fastener 236 may be disposed between a core cowl structure 238 such as a strut or bracket, and a core engine structure 240 such as a strut, a casing or bracket. The core cowl structure 238 may be fixedly coupled to the core cowl 122, such that the core cowl structure 238 moves with the core cowl 122, as described below. By contrast, the core engine structure 240 is not moveable with the core cowl 122 and instead may be fixedly coupled to a stationary and structural component of the core engine 146, such as the compressor casing 210 (as in the embodiment depicted), or one or more of the combustor casing 212, turbine casing 214, or a support frame such as a compressor frame 241, a mid-frame, or rear support frame (not shown) or turbomachine exhaust nozzle 140 (FIG. 2), etc.

The fastener 236 may be fixedly connected to the engine component 224. The fastener 236 may comprise a cam lock type fitting, bayonet fitting, quarter-turn fastener or other mechanical or electromechanical fastener or device that allows selectively coupling the engine component 224 to the core cowl 122 or the core engine 146. In particular embodiments, the core cowl 122 defines or includes an access opening or hatch 242 wherein the fastener 236 is accessible from the access opening 242.

Figures 10, 11:
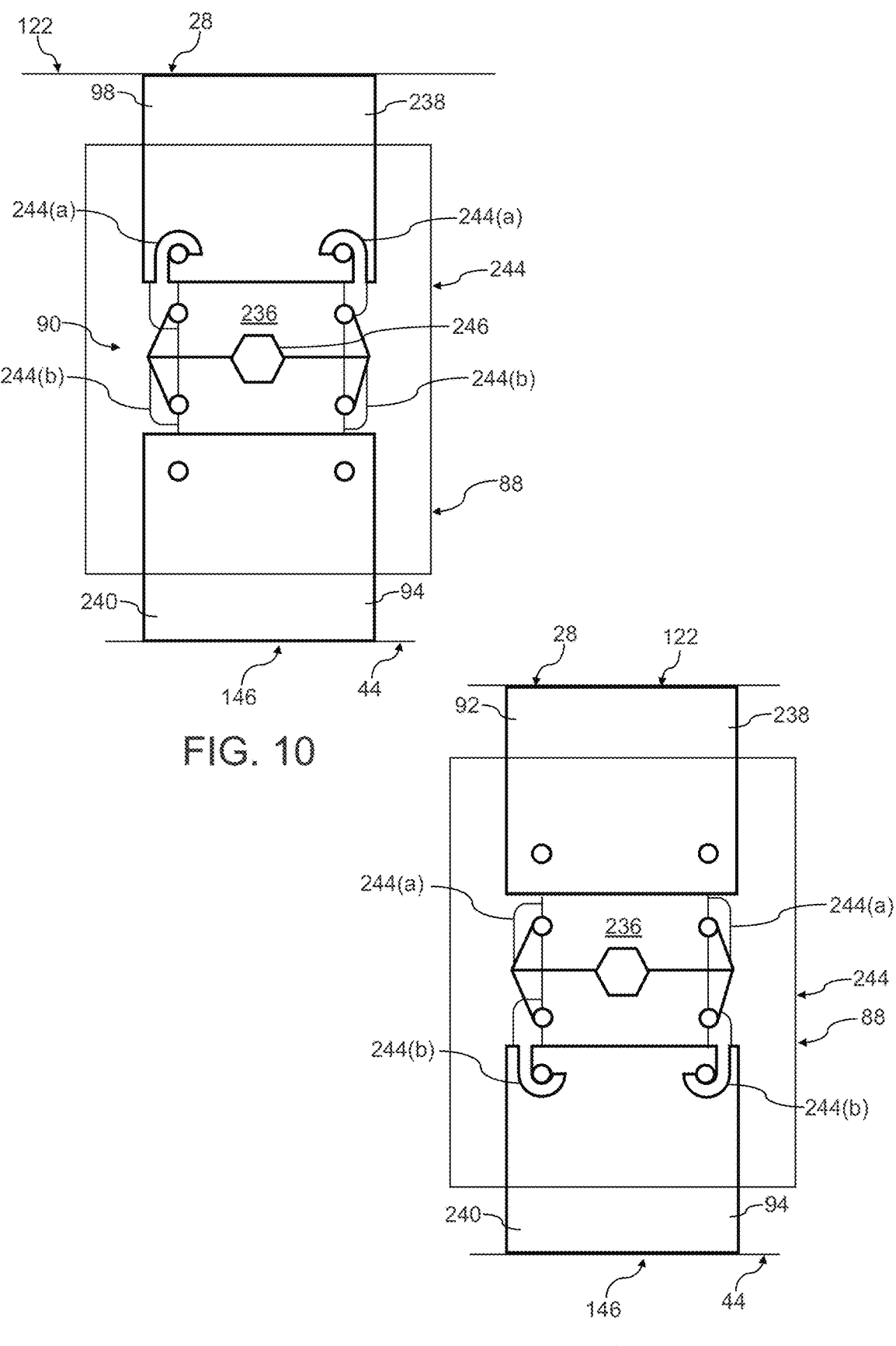
FIG. 10 is a schematic illustration including an engine component, a portion of a core cowl structure, an exemplary fastener and a portion of a core engine structure according to exemplary embodiments of the present disclosure.
FIG. 11 is a schematic illustration including an engine component, a portion of a core cowl structure, an exemplary fastener and a portion of a core engine structure according to exemplary embodiments of the present disclosure.

FIGS. 10 and 11 are schematic illustrations including engine component 224 or engine component 88, a portion of core cowl structure 238 or core cowl structure 92, an exemplary fastener 236 or fastener 90, and a portion of the core engine structure 240 or core engine structure 94 according to the present disclosure. In at least one embodiment, as shown in FIG. 10, the fastener 236, 90 includes a first plurality of articulating tabs 244(*a*) and a second plurality of articulating tabs 244(*b*). The tabs 244(*a*), 244(*b*) may be articulated about a pivot point 246 via a key or tool (not shown). The key or tool may inserted through the access opening 242, 98 shown in FIGS. 9 and 3.

In an exemplary embodiment, as show in FIG. 10, when in a first position the first plurality of tabs 244(*a*) engages with the core cowl structure 238, 92 and the second plurality of tabs 244(*b*) disengage from the core engine structure 240, 94, thereby coupling the engine component 224, 88 to the core cowl 122, 28 and decoupling the engine component 224, 88 from the core engine 146, 44. In this configuration, the engine component 224, 88 will travel with the core cowl 122, 28 when it is opened and rotated outward from the core engine 146, 44. In addition, in this configuration, the core cowl 122, 28 may carry the weight load of the engine component 224, 88 during operation of the gas turbine engine 100.

As shown in FIG. 11, when in a second position the first plurality of tabs 244(*a*) are disengaged from the core cowl structure 238, 92 and the second plurality of tabs 244(*b*) are engaged with the core engine structure 240, 94 thereby coupling the engine component 224, 88 to the core engine 146, 44, and decoupling the engine component 224, 88 from the core cowl 122, 28. In this configuration, the engine component 224, 88 will be rigidly coupled to the core engine 146, 44 whether the core cowl 122, 28 is opened or closed.

Figure 13:
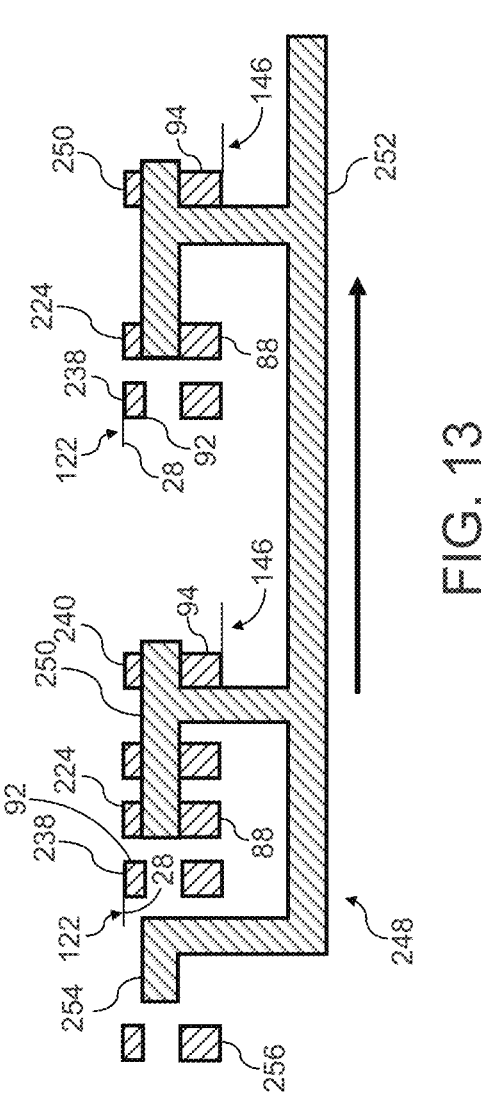
FIG. 13 is a schematic illustration including an engine component, a portion of a core cowl structure, a push-pull mechanism, and a portion of a core engine structure according to exemplary embodiments of the present disclosure.
Figure 12:
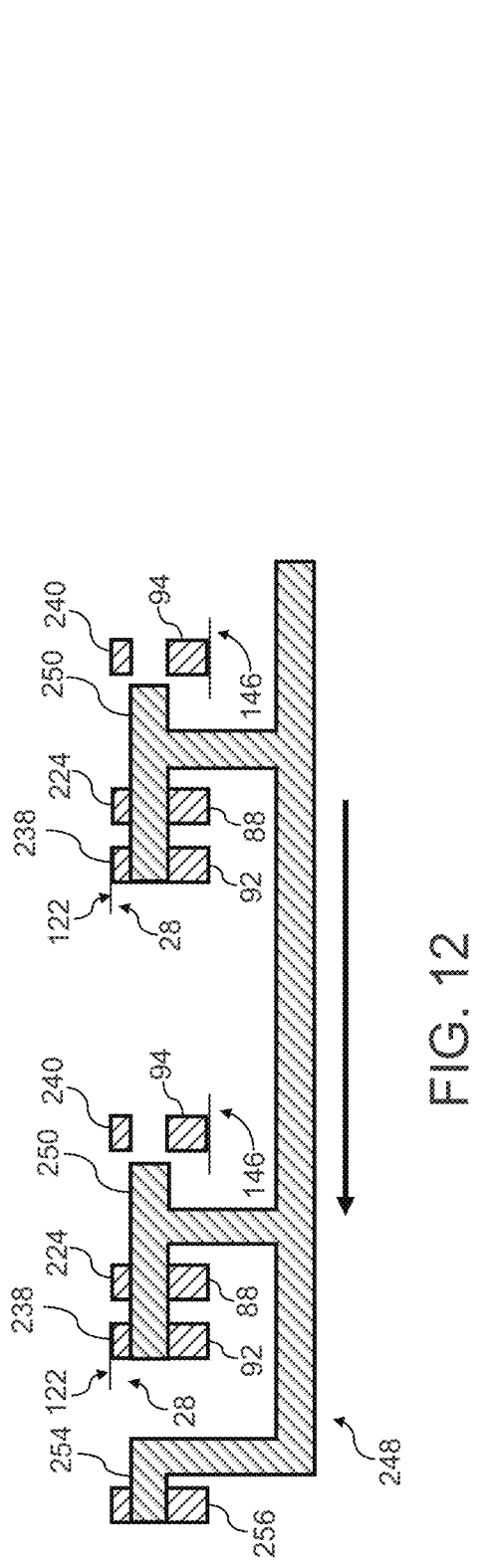
FIG. 12 is a schematic illustration including an engine component, a portion of a core cowl structure, a push-pull mechanism, and a portion of a core engine structure according to exemplary embodiments of the present disclosure.

FIGS. 12 and 13 are schematic illustrations including engine component 224, 88, a portion of core cowl structure 238, 92, a push-pull mechanism 248, and a portion of the core engine structure 240, 94 according to exemplary embodiments of the present disclosure. In various embodiments, as shown in FIGS. 12 and 13, the engine component 224, 88 is selectively coupled to the core cowl 122, 28 (FIG. 12) or the core engine 146 (FIG. 13) via push-pull mechanism 248. The push-pull mechanism 248 includes at least one protrusion or pin 250 fixed to a slidable rod 252. In a first position, as shown in FIG. 12, the pin(s) 250 engage(s) with the engine component 224, 88 and the core cowl 122, 28 via the core cowl structure 238, 92 and are disengaged from the core engine 146. In a second position, as shown in FIG. 13, the pin(s) 250 engage(s) with the with the engine component 224, 88 and the core engine 146, 44 via the core engine structure 240, 94 and are disengaged or decoupled from the core cowl 122, 28. In exemplary embodiments, the slidable rod 252 may be manipulated between the first position and the second position by a technician manually. In other embodiments, the slidable rod 252 may be manipulated between the first position and the second position hydraulicly or electrically. The slidable rod 252 will be movable while the core cowl 122, 28 is in a closed or at least partially closed state.

In exemplary embodiments as shown in FIGS. 12 and 13, the push-pull mechanism includes a second pin 254. As shown in FIG. 12 the second pin 254 engages with a door counterbalance mechanism or system 256 when the first pin(s) 250 is/are engaged with the core cowl 122, 28 and the engine component 224, 88. In exemplary embodiments, the door counterbalance mechanism 256 includes either a spring, or pressurized gas strut to counterbalance the weight of the core cowl 122, 28 as it is manipulated between open and closed states.

As alluded to earlier, the inventors discovered, unexpectedly during the course of gas turbine engine design—i.e., designing gas turbine engines having a variety of different primary fan and secondary fan characteristics—and evaluating an overall propulsive efficiency, significant relationships exist in a ratio of a core cowl diameter ratio (CDR), equal to the peak cowl diameter (D) divided by the maximum combustor casing diameter (d), and a core cowl length ratio (CLR), equal to the under-core cowl axial length (L1) divided by the overall core axial length (L). These relationships can be thought of as an indicator of the ability of a gas turbine engine to provide sufficient packaging space between the core engine combustor casing and the core cowl for packaging/mounting various accessories and/or engine systems, while also having a core engine capable of producing sufficient power to drive primary and secondary fans, particularly in more complex engine designs.

As engines become more complex (e.g., hybrid electric/load sharing between shafts, closed-loop thermal management systems, hot fuel, unducted, etc.), a reduction in core cowl size is concomitantly desired for greater overall engine performance. This, along with, in the case of an open rotor design (FIG. 4), the elimination of an outer nacelle enclosing a primary fan of the engine, has posed a significant challenge with engine accessory and engine support system packaging design that was not previously present in earlier engine designs. It will also be appreciated that a reduction in overall core engine axial length results in a reduction in space for packaging various engine accessories and support system components which are typically coupled to the outer nacelle, the core engine casings, or to various support frames of the gas turbine engine, generally beneath the core cowl.

It will be appreciated that a larger core cowl diameter is preferred to accommodate the packaging needs of a particular gas turbine engine design. However, if the core cowl diameter is too large various issues such as excess drag and weight may affect overall engine performance or propulsion efficiency. In addition, or in the alternative, if the core cowl is too large for a particular gas turbine engine design, issues with mounting and installing the engine occur. It will also be appreciated that a smaller core length for a given engine design provides various benefits, including but not limited to, reduced overall engine weight. This particular design is enabled at least in part by the three-stream engine design described above which provides less flow through the engine core for a given thrust output. However, it is to be appreciated that the engine length cannot be too small because of the power required to drive primary and mid-fans of the three-stream engine.

It will moreover be appreciated that elements that previously were previously mounted to nacelle and that are temperature sensitive, i.e., electronics, FADEC, have more limited/restricted areas where they can reside within the engine. For example, it was found that for the 3-stream engine embodiment that the FADEC is preferably located in the space located between third stream and outer nacelle, or forward of the compressor It will moreover be appreciated that inventors considered placement alternatively within the aircraft pylon supporting the engine (not shown in drawings). The discovery, below (Expression (1) and (2)) may be equally insightful and define the packaging size in those cases where some of the engine components normally housed in nacelle are moved to pylon, and where those components are located within the core cowl.

Notably, however, an engine having a core cowl diameter ratio (CDR) within the ranges described herein, particularly when also having a core engine length ratio (CLR) within the ranges described herein, may be particularly suited for mounting one or more of the components traditionally found within a nacelle of a ducted gas turbine engine within the core cowl of the gas turbine engine. For example, an engine having a core cowl diameter ratio (CDR) within the ranges described herein, particularly when also having a core engine length ratio (CLR) within the ranges described herein, may have a sufficient amount of room for these components, and further may have a sufficient amount of separation from hot turbomachinery during operation to allow positioning of one or more of these components within the core cowl, for example, power electronics and a Full Authority Digital Engine Control (FADEC), temperature-sensitive sensors, power cables.

As noted above, the inventors of the present disclosure discovered bounding the relationships defined by the core cowl diameter ratio (CDR) to the core engine length ratio (CLR) can result in a gas turbine engine maintaining or even improving upon a desired propulsive efficiency, while also taking into account the gas turbine engine's packaging concerns, weight concerns, and power requirements. The relationship discovered, infra, can identify an improved engine configuration suited for a particular mission requirement, one that takes into account installation, packaging and loading, power requirements, and other factors influencing the optimal choice for an engine configuration.

In addition to yielding an improved gas turbine engine, as explained in detail above, utilizing this relationship, the inventors found that the number of suitable or feasible gas turbine engine designs incorporating a primary fan and a secondary fan, and defining a third stream, capable of meeting both the propulsive efficiency requirements and packaging, weight could be greatly diminished, thereby facilitating a more rapid down selection of designs to consider as a gas turbine engine is being developed. Such a benefit provides more insight to the requirements for a given gas turbine engine well before specific technologies, integration and system requirements are developed fully. Such a benefit avoids late-stage redesign.

The desired relationships providing for the improved gas turbine engine, discovered by the inventors, are expressed as:

US 12,631,146 B2

17

$$CDR = D/d \tag{1}$$

$$CLR = L1/L \tag{2}$$

where CDR is maximum core cowl diameter D to maximum combustor casing diameter ratio d, and CLR is under-core cowl axial length L1 divided by overall core axial length L.

Values for various parameters of the influencing characteristics of an engine defined by Expressions (1) and (2) are set forth below in TABLE 1:

TABLE 1

| Symbol | Description | Ranges appropriate for using Expression (1) |
|---|---|---|
| D/d | Core Cowl Diameter Ratio (CDR) | 2.7 to 3.5, such as 2.8 to 3.3, such as 2.9 to 3.1 |
| L1/L | Core Cowl Length Ratio (CLR) | 0.25 to 0.50, such as 0.3 to 0.45, such as 0.35 to 0.45, such as .40 to .45 |

Figure 14:
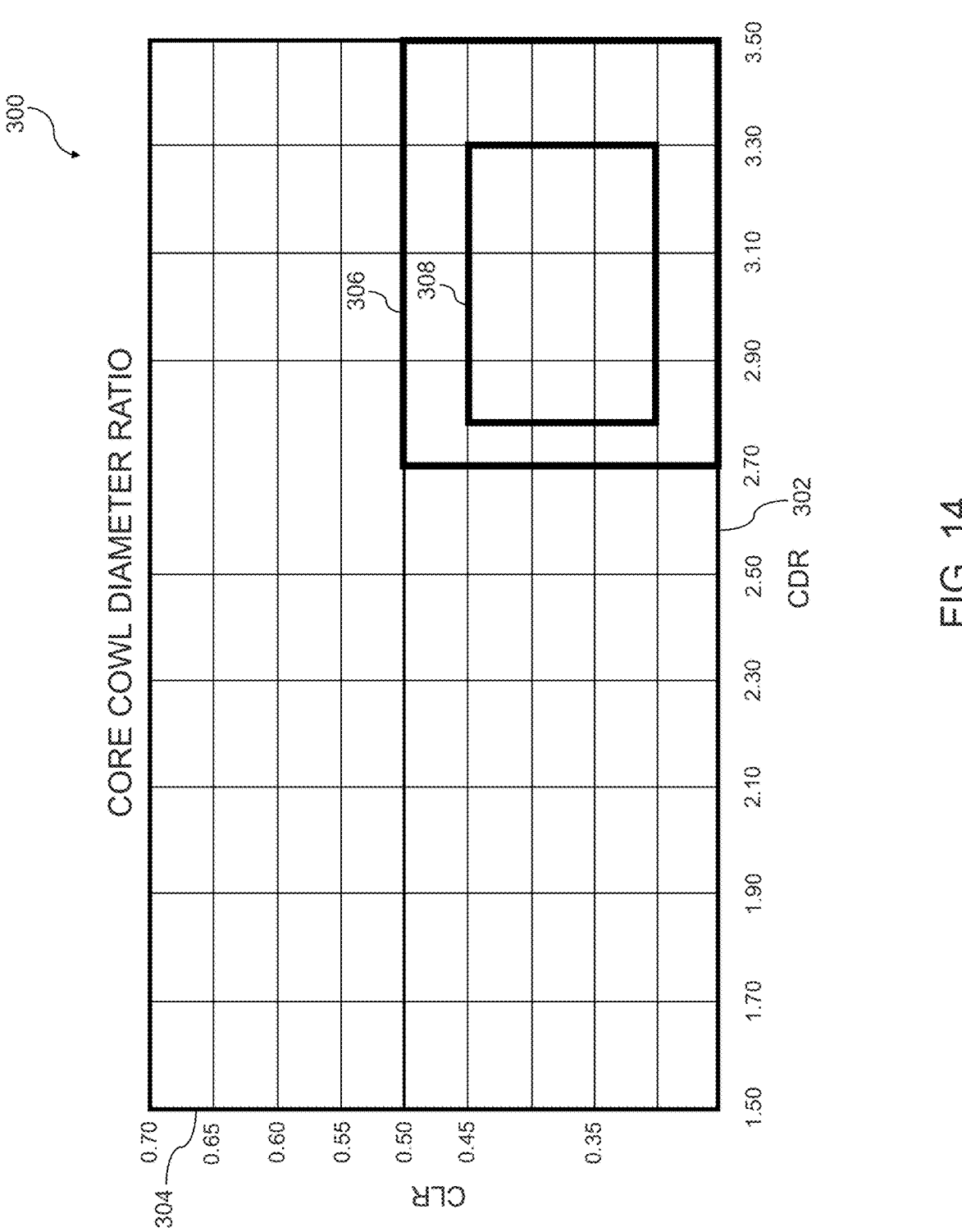
FIG. 14 is a graphical representation illustrating a relationship between CDR and CLR and showing relationships between the various parameters of Expressions (1) and (2) according to exemplary embodiments of the present disclosure.

FIG. 14 is a plot 300 illustrating the relationship between CDR and CLR and showing the relationships between the various parameters of Expressions (1) and (2). The plot 300 includes CDR values on an X-axis 302 and CLR values on a Y-axis 304. The plot 300 depicts an area 306 of CDR and CLR values where a gas turbine engine would provide sufficient packaging space between a core engine combustor casing and a core cowl for packaging/mounting various accessories and/or engine systems, while also having a core engine capable of producing sufficient power to drive primary and secondary fans. The plot 300 further depicts an area 308 of CDR and CLR values where a gas turbine engine may provide more desired packaging space between the core engine combustor casing and the core cowl for packaging/mounting various accessories and/or engine systems, while also having the core engine capable of producing sufficient power to drive primary and secondary fans. The exemplary gas turbine engine of FIG. 4 defines a CDR and a CLR within the area 308.

It will be appreciated that although the discussion above is generally relating to the open rotor engine 100 described above with reference to, e.g., FIG. 8, in various embodiments of the present disclosure, the relationships outlined above with respect to, e.g., Expressions (1) and (2) may be applied to any other suitable engine architecture.

Figure 15:
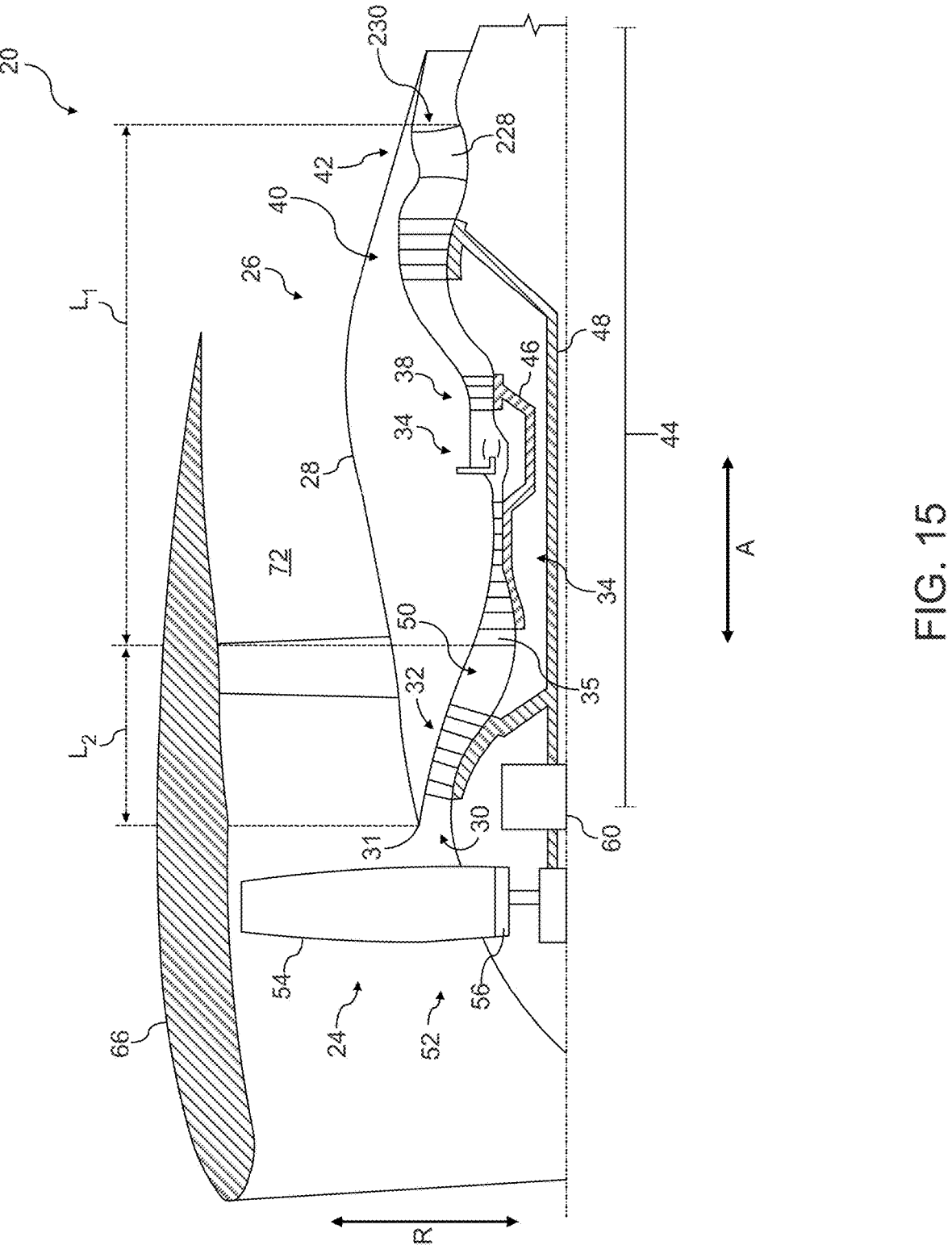
FIG. 15 is a schematic cross-sectional view of a ducted turbofan engine in accordance with an exemplary embodiment of the present disclosure.

Referring now to FIG. 15, a gas turbine engine 20 in accordance with another exemplary aspect of the present disclosure is provided. The exemplary gas turbine engine of FIG. 15 is configured in a similar manner as the exemplary gas turbine engine 20 described above with reference to FIGS. 2 and 3. Accordingly, the exemplary gas turbine engine 20 of FIG. 15 is configured as a ducted gas turbine engine (i.e., includes a fan 52 with a nacelle 66 enclosing the fan 52). The same or similar numbers may refer to the same or similar parts.

For example, the gas turbine engine 20 generally includes a includes a fan section 24 and a turbomachine 26 disposed downstream from the fan section 24. The exemplary turbomachine 26 depicted generally includes an engine casing or core cowl 28 that defines an annular core inlet 30. The core cowl 28 at least partially encases, in serial flow relationship, a compressor section including a booster or low-pressure compressor 32 and a high-pressure compressor 34, a combustion section 36, a turbine section including a high-pressure turbine 38 and a low-pressure turbine 40, and at least a portion of a jet exhaust nozzle 42. Together, these components or sections make up a core engine 44 of the turbomachine 26.

A high-pressure shaft 46 drivingly connects the high-pressure turbine 38 to the high-pressure compressor 34. A low-pressure shaft 48 drivingly connects the low-pressure turbine 40 to the low-pressure compressor 32. The compressor section, combustion section 36, turbine section, and jet exhaust nozzle 42 together define a working gas flow path 50 through the gas turbine engine 20.

For the embodiment depicted, the fan section 24 includes a fan 52 having a plurality of fan blades 54 coupled to a disk 56 in a spaced apart manner. As depicted, the fan blades 54 extend outwardly from disk 56 generally along the radial direction R. The fan blades 54 are rotatable about the longitudinal centerline 22 by the low-pressure shaft 48.

In an exemplary embodiment, as shown in FIG. 15, the gas turbine engine 20 further includes a gearbox 60. The gearbox 60 includes a plurality of gears for adjusting a rotational speed of the fan 52 relative to a rotational speed of the low-pressure shaft 48, such that the fan 52 and the low-pressure shaft 48 may rotate at more efficient relative speeds. The gearbox 60 may be any type of gearbox suitable to facilitate coupling the low-pressure shaft 48 to the fan 52 while allowing each of the low-pressure turbine 40 and the fan 52 to operate at a desired speed. For example, in some embodiments, the gearbox 60 may be a reduction gearbox.

More specifically, in some embodiments, the gearbox 60 may define a gear ratio of the input rotational speed (e.g., the low-pressure shaft 48) to the output rotational speed greater than 3 and less than 14. For example, in certain exemplary embodiments, the gearbox 60 may define a gear ratio greater than 4, such as greater than 5, such as greater than 6 and less than 12, such as less than 11. Inclusion of the gearbox 60 with a relatively high gear ratio may allow for a relatively high diameter fan 52 in combination with a relatively high speed low-pressure turbine 40.

As will also be appreciated, the gas turbine engine 20 defines an under-core cowl axial length (L1) along an axial direction A. More specifically, the gas turbine engine 20 includes a high-pressure compressor inlet guide vane 35 having a leading edge (not labeled), where the under-core cowl axial length (L1) is measured along the axial direction A from the leading edge of the high-pressure compressor inlet guide vane 35 to a trailing edge 230 of a strut 228 extending through the exhaust nozzle 42 (which may be a strut of a turbine rear frame). The under-core cowl axial length (L1) is therefore generally a measure along the axial direction A from the high-pressure compressor 34 to the exhaust of the gas turbine engine 20.

Further, the gas turbine engine 20 defines an initial compression axial length (L2) along the axial direction A. The initial compression axial length (L2) is measured along the axial direction A from a splitter 31 positioned at the inlet 30 of the turbomachine 26 to the leading edge of the high-pressure compressor inlet guide vane 35. In the embodiment depicted, the low-pressure compressor 32 is located downstream of the splitter 31 and upstream of the leading edge of the high-pressure compressor inlet guide vane 35 (and is the only compressor within this axial location).

It will be appreciated, however, that in other exemplary embodiments, the compressor section may have one or more intermediate stages of compression (e.g., an intermediate-pressure compressor in addition to the low-pressure compressor 32).

Further, it will be appreciated that the exemplary gas turbine engine 20 depicted in FIG. 15 may be configured as a narrow-body engine (i.e., an engine configured to provide thrust to a narrow-body aircraft). In such a manner, the gas turbine engine 20 may be configured to generate at least 18,000 pounds of thrust and less than 80,000 pounds of thrust during operation at a rated speed during standard day operating conditions, such as between 25,000 and 60,000 pounds of thrust during operation at a rated speed during standard day operating conditions, such as between 25,000 and 50,000 pounds of thrust during operation at a rated speed during standard day operating conditions.

It will be appreciated that although the description of the under-core cowl axial length (L1) and the initial compression axial length (L2) is described above with reference to the gas turbine engine 20 of FIG. 15 (which includes a speed reduction device, i.e., reduction gearbox 60, for transmitting shaft power to the main or primary fan, a nacelle 66 enclosing fan 52; and is a two stream engine, i.e., includes a bypass airflow passage 72 and a working gas flowpath 50, but not a third stream), in other embodiments, aspects of the present disclosure may be applied to other suitable gas turbine engines. For example, in other embodiments, the aspects described herein with respect to the under-core cowl axial length (L1) and the initial compression axial length (L2) (and the ICLR, as defined below), may apply to an unducted gas turbine engine (i.e., does not include a nacelle surrounding the primary fan; see, e.g., FIG. 4), a three stream gas turbine engine (i.e., includes a third stream; see, e.g., FIG. 4), etc. Notably, when applied to a three stream gas turbine engine, the initial compression axial length (L2) may be defined from a splitter at an upstream-most inlet to a ducted portion of the engine, downstream of the primary fan (e.g., the splitter at the engine inlet 182 in FIG. 4) to the leading edge of the high-pressure compressor inlet guide vane 35.

As will be appreciated from the description herein, the inventors further discovered, unexpectedly, during the course of designing high bypass gas turbine engines (i.e., bypass ratio above 12) having a variety of turbomachine characteristics, a significant relationship exist in a ratio of the initial compression axial length (L2) to the under-core cowl axial length (L1). This ratio, referred to herein as an initial compression length ratio (ICLR), reflects a space available for packaging, including the portion of the under-cowl space available for locating more temperature-sensitive components for engines, and accounting for the less space available because the fan duct size and space typically chosen for storing accessories and power or communications equipment is limited or no longer available (as bypass ratio increases, the weight and drag associated with the fan duct correspondingly increases in size so as to becomes too prohibitive unless the fan duct storage volume is reduced in size, thereby mitigating the drag and weight associated with the higher bypass area).

In some embodiments, when combined with the CDR, it was unexpectedly found that an undercowl space was discovered that best balanced the need for accommodating a high-pressure compressor having 9, 10 or 11 stages; or a high-pressure compressor having less than 8 stages combined with a low-pressure compressor (or booster) having 4, 5 or 6 stages, while meeting a need for reducing a drag profile or skin friction of the engine casing as much as possible. In other embodiments, it was unexpectedly found that an undercowl space was discovered that best balanced the need for accommodating a low-pressure turbine having 4, 5 or 6 stages while balancing the need for reducing a drag profile or skin friction of the engine casing as much as possible. Importantly, in each of these examples the CDR and ICLR values also account for the packaging needed in the casing for components that may no longer be stored in the fan nacelle or when the fan nacelle is no longer present (e.g., as discussed earlier in connection with the open fan).

Compared to more traditional turbofan engines that have a relatively low diameter fan that rotate relatively quickly as a result of being driven directly from a low-pressure turbine of the turbofan engine (i.e., without a reduction gearbox), the inventors have found that by using a higher diameter fan driven through a reduction gearbox, the under-core cowl length (L1) may be reduced. In particular, such allows the primary fan to rotate at a lower angular rate relative to the low-pressure turbine, which efficiency can increase by rotating at a higher rate while maintaining a desired tip speed of the fan. Higher speeds of the low-pressure turbine may allow for less stages while extracting the same (or greater) amount of power. The lower speeds of the fan may allow for the fan to increase in diameter, which leads to a higher bypass ratio and lowered specific fuel consumption.

However, reduction of L1 may impose additional stress on high-pressure components (e.g., the high-pressure compressor and a high-pressure turbine). In particular, increases in initial compression length ratio (ICLR) may generally require the overall compressor ratio to be increased, which generally results in higher temperatures and pressures at an exit of the high-pressure compressor and at an inlet to the high-pressure turbine. Accordingly, increasing the initial compression length ratio (ICLR) too much may create an undesirable amount of stress (and premature wear) on the gas turbine engine.

In addition to yielding an improved turbofan engine, as explained in detail above, utilizing this relationship, the inventors found that the number of suitable or feasible turbofan engine designs capable of meeting both the propulsive efficiency requirements and limited stress and wear requirements could be greatly diminished, thereby facilitating a more rapid down selection of designs to consider as a turbofan engine is being developed. Such a benefit provides more insight to the requirements for a given turbofan engine well before specific technologies, integration and system requirements are developed fully. Such a benefit avoids late-stage redesign.

The desired relationships providing for the improved turbofan engine, discovered by the inventors, are expressed as:

$$ICLR = L2/L1 \qquad (3)$$

where ICLR is a ratio of the initial compression axial length (L2) to the under-core cowl axial length (L1).

Figure 16:
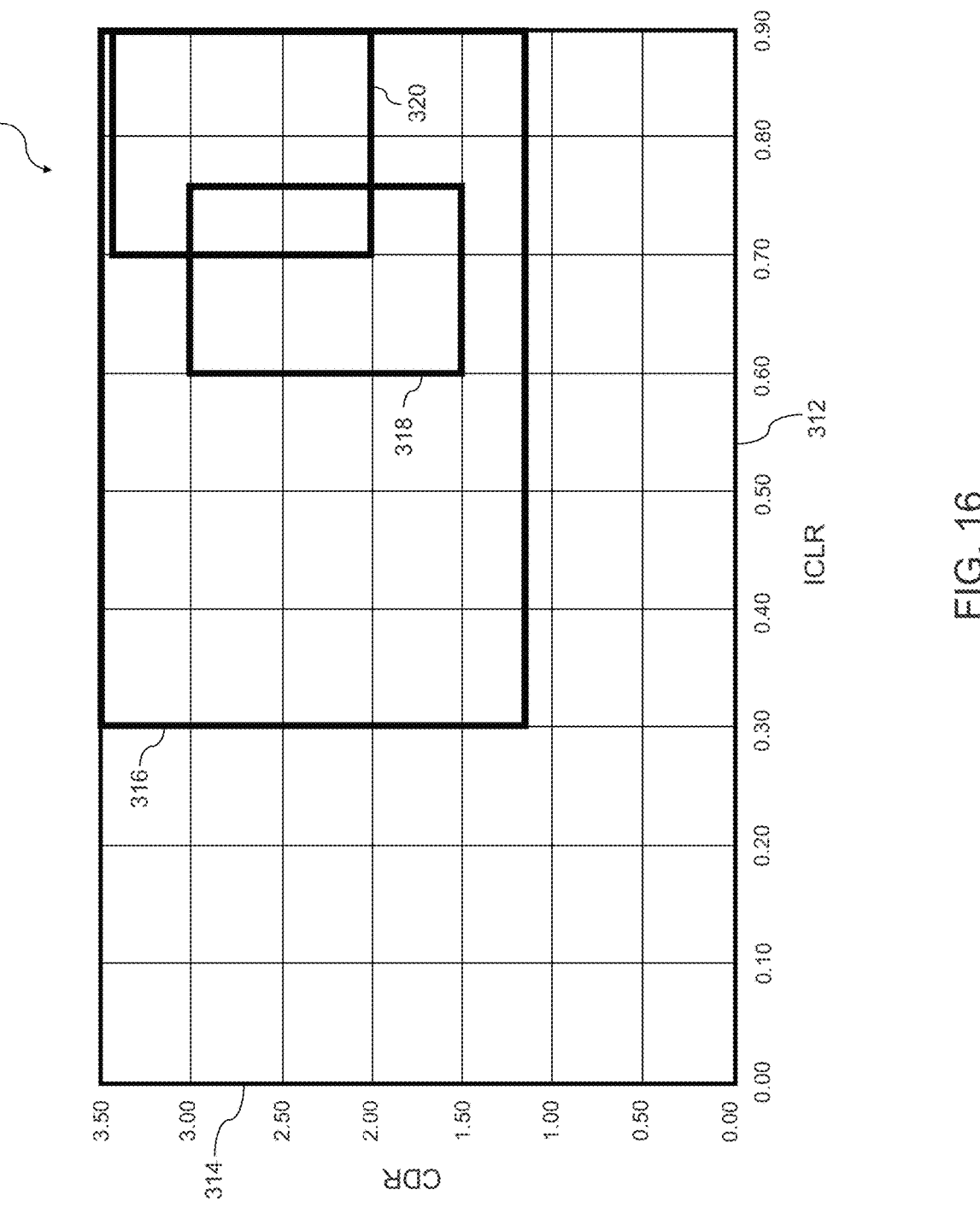
FIG. 16 is a graphical representation illustrating initial compression length ratio (ICLR) values for gas turbine engines in accordance with various exemplary embodiments of the present disclosure.

FIG. 16 is a plot 310 illustrating ICLR values, and more specifically, illustrating ICLR values along an X-axis 312 and CDR (Core Cowl Diameter Ratio) along the Y-axis 314. The plot 310 depicts an area 316 of ICLR values of a gas turbine engine in accordance with one or more aspects of the present disclosure where the gas turbine engine would provide desirable propulsive efficiency without overly stressing and wearing the gas turbine engine. The area 316 reflects ICLR values greater than or equal to 0.3 and less than or equal to 0.9, with CDR values greater than or equal to 1.24 and less than or equal to 3.5.

Referring still to the plot 310 of FIG. 16, the plot 310 further defines an area 318 of ICLR values of a gas turbine engine in accordance with one or more additional aspects of the present disclosure. The area 318 reflects ICLR values greater than or equal to 0.60 and less than or equal to 0.75, with CDR values greater than or equal to 1.5 and less than or equal to 3.0. The gas turbine engines of the present disclosure falling within the area 318 may be two stream turbofan engines (i.e., turbofan engines without a third stream), ducted turbofan engines, or both. As will be appreciated, two stream turbofan engines may not require as large of an initial compression axial length L2, and similarly ducted turbofan engines may be limited in maximum fan diameter (which as will be appreciated from the discussion above may similarly limit the ICLR). The exemplary gas turbine engine of FIG. 15 defines an ICLR and CDR within the area 318.

Referring still to the plot 310 of FIG. 16, the plot 310 further defines an area 320 of ICLR values of a gas turbine engine in accordance with one or more further aspects of the present disclosure. The area 320 reflects ICLR values greater than or equal to 0.70 and less than or equal to 0.89, with CDR values greater than or equal to 2.0 and less than or equal to 3.4. The gas turbine engines of the present disclosure falling within the area 320 may be three stream turbofan engines (i.e., turbofan engines including a third stream, such as the turbofan engines of FIGS. 4, 6, 8 and 9 having fan ducts 172), unducted turbofan engines, or both. As will be appreciated, three stream turbofan engines may include a larger initial compression axial length L2 (e.g., by virtue of the mid-fan), and similarly unducted turbofan engines may include a fan with a larger fan diameter (which as will be appreciated from the discussion above may allow for an increase in the ICLR). The exemplary gas turbine engine of FIG. 4 defines an ICLR and CDR within the area 320.

Notably, the above areas 316, 318, 320 may more specifically be directed to narrow-body engines. In such a manner, the gas turbine engines within these ranges may be configured to generate at least 18,000 pounds of thrust and less than 80,000 pounds of thrust during operation at a rated speed during standard day operating conditions, such as between 25,000 and 60,000 pounds of thrust during operation at a rated speed during standard day operating conditions, such as between 25,000 and 50,000 pounds of thrust during operation at a rated speed during standard day operating conditions. As will be appreciated, as an engine extends outside of this thrust class, a relationship of fan diameter, fan speed, high-pressure compressor size, and/or low-pressure turbine size may interact differently, such that the areas of ICLR values may not as readily capture desired gas turbine engines.

Another example of an unducted turbofan engine can be found in U.S. patent application Ser. No. 16/811,368 (Published as U.S. Patent Application Publication No. 2021/0108597), filed Mar. 6, 2020 (FIG. 10, Paragraph [0062], et al.; including an annular fan case 13 surrounding the airfoil blades 21 of rotating element 20 and surrounding vanes 31 of stationary element 30; and including a third stream/fan duct 73 (shown in FIG. 10, described extensively throughout the application)). Various additional aspects of one or more of these embodiments are discussed below. These exemplary aspects may be combined with one or more of the exemplary gas turbine engine(s) discussed above with respect to the figures.

For example, in some embodiments of the present disclosure, the engine may include a heat exchanger located in an annular duct, such as in a third stream. The heat exchanger may extend substantially continuously in a circumferential direction of the gas turbine engine (e.g., at least 300 degrees, such as at least 330 degrees).

In one or more of these embodiments, a threshold power or disk loading for a fan (e.g., an unducted single rotor or primary forward fan) may range from 25 horsepower per square foot ($hp/ft^2$) or greater at cruise altitude during a cruise operating mode. In particular embodiments of the engine, structures and methods provided herein generate power loading between 80 $hp/ft^2$ and 160 $hp/ft^2$ or higher at cruise altitude during a cruise operating mode, depending on whether the engine is an open rotor or ducted engine.

In various embodiments, an engine of the present disclosure is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

As such, it will be appreciated that an engine of such a configuration may be configured to generate at least 25,000 pounds and less than 80,000 of thrust during operation at a rated speed, such as between 25,000 and 50,000 pounds of thrust during operation at a rated speed, such as between 25,000 and 40,000 pounds of thrust during operation at a rated speed. Alternatively, in other exemplary aspects, an engine of the present disclosure may be configured to generate much less power, such as at least 2,000 pounds of thrust during operation at a rated speed.

In various exemplary embodiments, the fan (or rotor) may include twelve (12) fan blades. From a loading standpoint, such a blade count may allow a span of each blade to be reduced such that the overall diameter of the primary fan may also be reduced (e.g., to twelve feet in one exemplary embodiment). That said, in other embodiments, the fan may have any suitable blade count and any suitable diameter. In certain suitable embodiments, the fan includes at least eight (8) blades. In yet another suitable embodiment, the fan may have at least fifteen (15) blades. In yet another suitable embodiment, the fan may have at least eighteen (18) blades. In one or more of these embodiments, the fan includes twenty-six (26) or fewer blades, such as twenty (20) or fewer blades.

Further, in certain exemplary embodiments, the rotor assembly may define a rotor diameter (or fan diameter) of at least 10 feet, such as at least 11 feet, such as at least 12 feet, such as at least 13 feet, such as at least 15 feet, such as at least 17 feet, such as up to 28 feet, such as up to 26 feet, such as up to 24 feet, such as up to 18 feet.

In various embodiments, it will be appreciated that the engine includes a ratio of a quantity of vanes to a quantity of blades that could be less than, equal to, or greater than 1:1. For example, in particular embodiments, the engine includes twelve (12) fan blades and ten (10) vanes. In other embodiments, the vane assembly includes a greater quantity of vanes to fan blades. For example, in particular embodiments, the engine includes ten (10) fan blades and twenty-three (23) vanes. For example, in certain embodiments, the engine may include a ratio of a quantity of vanes to a quantity of blades between 1:2 and 5:2. The ratio may be tuned based on a variety of factors including a size of the vanes to ensure a desired amount of swirl is removed for an airflow from the primary fan.

Additionally, in certain exemplary embodiments, where the engine includes the third stream and a mid-fan (a ducted fan aft of the primary, forward fan), a ratio R1/R2 may be between 1 and 10, or 2 and 7, or at least 3.3, at least 3.5, at least 4 and less than or equal to 7, where R1 is the radius of the primary fan and R2 is the radius of the mid-fan.

It should be appreciated that various embodiments of the engine, such as the single unducted rotor engine depicted and described herein, may allow for normal subsonic aircraft cruise altitude operation at or above Mach 0.5. In certain embodiments, the engine allows for normal aircraft operation between Mach 0.55 and Mach 0.85 at cruise altitude. In still particular embodiments, the engine allows for normal aircraft operation between Mach 0.75 and Mach 0.85. In certain embodiments, the engine allows for rotor blade tip speeds at or less than 750 feet per second (fps). In other embodiments, the rotor blade tip speed at a cruise flight condition can be 650 to 900 fps, or 700 to 800 fps. A fan pressure ratio (FPR) for the primary fan of the fan assembly can be 1.04 to 2.20, or in some embodiments 1.05 to 1.2, or in some embodiments less than 1.08, as measured across the fan blades of the primary fan at a cruise flight condition.

In order for the gas turbine engine to operate with a fan having the above characteristics to define the above FPR, a gear assembly may be provided to reduce a rotational speed of the fan assembly relative to a driving shaft (such as a low-pressure shaft coupled to a low-pressure turbine). In some embodiments, a gear ratio of the input rotational speed to the output rotational speed is between 3.0 and 4.0, between 3.2 and 3.5, or between 3.5 and 4.5 (inclusive of the endpoints). In some embodiments, a gear ratio of the input rotational speed to the output rotational speed is greater than 4.1. For example, in particular embodiments, the gear ratio is within a range of 4.1 to 14.0, within a range of 4.5 to 14.0, or within a range of 6.0 to 14.0. In certain embodiments, the gear ratio is within a range of 4.5 to 12 or within a range of 6.0 to 11.0.

With respect to a turbomachine of the gas turbine engine, the compressors and/or turbines can include various stage counts. As disclosed herein, the stage count includes the number of rotors or blade stages in a particular component (e.g., a compressor or turbine). For example, in some embodiments, a low-pressure compressor may include 1 to 8 stages, a high-pressure compressor may include 4 to 15 stages, a high-pressure turbine may include 1 to 2 stages, and/or a low-pressure turbine (LPT) may include 1 to 7 stages. In particular, the LPT may have 4 stages, or between 4 and 7 stages. For example, in certain embodiments, an engine may include a one stage low-pressure compressor, an 11-stage high-pressure compressor, a two-stage high-pressure turbine, and 4 stages, or between 4 and 7 stages for the LPT. As another example, an engine can include a three-stage low-pressure compressor, a 10-stage high-pressure compressor, a two stage high-pressure turbine, and a 7 stage low-pressure turbine.

The reduced installed drag may further provide for improved efficiency, such as improved specific fuel consumption. Additionally, or alternatively, the reduced installed drag may provide for cruise altitude engine and aircraft operation at the above describe Mach numbers at cruise altitude. Still particular embodiments may provide such benefits with reduced interaction noise between the blade assembly and the vane assembly and/or decreased overall noise generated by the engine by virtue of structures located in an annular duct of the engine.

Additionally, it should be appreciated that ranges of power loading and/or rotor blade tip speed may correspond to certain structures, core sizes, thrust outputs, etc., or other structures of the core engine. However, as previously stated, to the extent one or more structures provided herein may be known in the art, it should be appreciated that the present disclosure may include combinations of structures not previously known to combine, at least for reasons based in part on conflicting benefits versus losses, desired modes of operation, or other forms of teaching away in the art.

Although depicted above as an unshrouded or open rotor engine in the embodiments depicted above, it should be appreciated that aspects of the disclosure provided herein may be applied to shrouded or ducted engines, partially ducted engines, aft-fan engines, or other gas turbine engine configurations, including those for marine, industrial, or aero-propulsion systems. Certain aspects of the disclosure may be applicable to turbofan, turboprop, or turboshaft engines. However, it should be appreciated that certain aspects of the disclosure may address issues that may be particular to unshrouded or open rotor engines, such as, but not limited to, issues related to gear ratios, fan diameter, fan speed, length (L) of the engine, maximum diameter of the core engine (D) of the engine, L/D of the engine, desired cruise altitude, and/or desired operating cruise speed, or combinations thereof.

In certain exemplary embodiments of the present disclosure, a thermal management system is provided with a gas turbine engine, the thermal management system thermally connecting one or more heat sink heat exchangers with one or more heat source heat exchanger to efficiently and effectively manage thermal issues within the gas turbine engine. Such a configuration, when combined with a gas turbine engine defining a core cowl diameter ratio (CDR) and a core cowl length ratio (CLR), as described hereinabove, can be particularly beneficial when incorporating de-icing systems as a heat sink exchanger of the thermal management system, as such a configuration can improve a usage of space within the gas turbine engine.

As discussed above, the gas turbine engine defines the core cowl diameter ratio (CDR) and core cowl length ratio (CLR), leading to improved propulsive efficiency in the gas turbine engine. Integration of a thermal management system in accordance with the disclosure hereinbelow directly complements and enhances the improvements in propulsive efficiency by effectively managing thermal loads within the gas turbine engine, and in particular by effectively managing thermal loads of various accessory systems of the gas turbine engines. For example, by having a common heat sink, or common plurality of heat sinks, for a given set of heat sources, a thermal load required to be managed by each heat sink (or a number of heat sinks, or both) may be reduced leading to a reduced footprint of the thermal management system within the gas turbine engine.

In one embodiment, for example, such a thermal management system can efficiently move heat from one or more accessory systems of the gas turbine engine (e.g., a main lubrication system of the gas turbine engine) to, e.g., a de-icing module of the gas turbine engine and/or aircraft including the gas turbine engine. Traditional de-icing systems can require extensive piping to transport bleed air to affected surfaces, which not only consumes valuable space within an undercowl area of the gas turbine engine, but also adds significant weight, potentially adversely affecting a fuel efficiency of the engine.

In such a manner, it will be appreciated that by incorporating the thermal management system disclosed hereinbelow that utilizes a heat exchange fluid to provide heat to a de-icing module—eliminating or reducing a need for bleed air and its associated heavy piping—a physical space required within the engine cowl to house accessory systems can be reduced. This reduction can enable lowering a peak cowl diameter (D), allowing the gas turbine engine to define the core cowl diameter ratio (CDR) and core cowl length ratio (CLR) discussed hereinabove.

It will therefore be appreciated that a combination of a gas turbine engine defining a core cowl diameter ratio (CDR) and a core cowl length ratio (CLR) discussed hereinabove, with the thermal management system discussed hereinbelow provides a synergistic improvement to the gas turbine engine design, that provides for further improvements to engine efficiency and performance.

Figure 17:
FIG. 17 is a schematic, cross-sectional view of an exemplary gas turbine engine according to various additional embodiments of the present subject matter.

Referring now back to the drawings, FIG. 17 is a schematic, cross-sectional view of a gas turbine engine in accordance with an exemplary embodiment of the present disclosure. More particularly, the exemplary embodiment of FIG. 17 may be configured in substantially the same manner as the exemplary gas turbine engine 100 of FIG. 4. In such a manner, the gas turbine engine 100 of FIG. 17 may be configured as an open rotor gas turbine engine Moreover, for example, the exemplary gas turbine engine 100 of FIG. 17 also defines or includes an inlet duct 180 and a fan duct 172. The inlet duct 180 extends between an engine inlet 182 and a core inlet 124 (to the turbomachine 120) and a fan duct inlet 176 (to the fan duct 172).

Further, for the exemplary engine 100 of FIG. 17, the engine 100 includes a core cowl 122 that annularly encases at least a portion of the turbomachine 120 and a fan cowl 170 that annularly encases at least a portion of the core cowl 122 and is generally positioned outward of at least a portion of the core cowl 122 along a radial direction R. Particularly, a downstream section of the fan cowl 170 extends over a forward portion of the core cowl 122 to define at least in part the fan duct 172.

Moreover, as is depicted schematically, the exemplary gas turbine engine 100 further includes various accessory systems to aid in the operation of the gas turbine engine 100 and/or an aircraft including the gas turbine engine 100 (see FIG. 19, below). For example, the exemplary gas turbine engine 100 further includes a main lubrication system 578 configured to provide a lubricant to, e.g., various bearings and gear meshes in the compressor section (including an LP compressor 126 and an HP compressor 128), the turbine section (including an HP turbine 132 and an LP turbine 134), an HP spool 136, an LP spool 138, and a power gear box 155. The lubricant provided by the main lubrication system 578 may increase the useful life of such components and may remove a certain amount of heat from such components. Additionally, the gas turbine engine 100 includes a compressor cooling air (CCA) system 580 for providing air from one or both of the HP compressor 128 or LP compressor 126 to one or both of the HP turbine 132 or LP turbine 134, or other hot component of the gas turbine engine 100. Moreover, the exemplary gas turbine engine 100 includes an active thermal clearance control (ACC) system 582 for cooling a casing of the turbine section to maintain a clearance between the various turbine rotor blades and the turbine casing within a desired range throughout various engine operating conditions. Furthermore, the exemplary gas turbine engine 100 includes a generator lubrication system 584 for providing lubrication to an electronic generator, as well as cooling/heat removal for the electronic generator. The electronic generator may provide electrical power to, e.g., a startup electric motor for the gas turbine engine 100 and/or various other electronic components of the gas turbine engine 100 and/or an aircraft including the gas turbine engine 100.

As is also depicted schematically, the exemplary gas turbine engine 100 drives or enables various other accessory systems for an aircraft including the exemplary gas turbine engine 100. For example, the exemplary gas turbine engine 100 provides compressed air from the compressor section to an environmental control system (ECS) 586. The ECS 586 may provide an air supply to a cabin of the aircraft for pressurization and thermal control (see, e.g., FIG. 19). Additionally, air may be provided from the exemplary gas turbine engine 100 to an electronics cooling system 588 for maintaining a temperature of certain electronic components of the gas turbine engine 100 and/or aircraft within a desired range.

It will be appreciated that for the embodiment of FIG. 17, each of the above accessory systems are located in an under-cowl area (i.e., in an area inward of the core cowl 122 and outward of a core air flowpath of the turbomachine 120). It will be appreciated, however, that in other exemplary embodiments, one or more of these accessory systems may alternatively be located at other suitable locations on the gas turbine engine 100. For example, in one or more of the exemplary embodiments, one or more accessory systems may be located at different locations within the undercowl area, in the fan cowl 170, or in a strut or pylon mounting the gas turbine engine 100 to, e.g., a wing of an aircraft.

Positioning the accessory systems at different locations within the undercowl area may allow for reduced exposure of the accessory system to heat within the undercowl area (e.g., over the compressor section may be cooler than over the turbine section), while still maintaining proximity to the rotating components of the turbomachine.

Similarly, positioning the accessory systems within the fan cowl 170 may allow for further reduced exposure of the accessory system to heat. However, the fan cowl 170 may not offer as much space, and is further from the rotating components of the turbomachine 120.

Finally, positioning the accessory systems within a strut or pylon mounting the gas turbine engine 100 to, e.g., a wing of an aircraft may allow for even further reduced exposure of the accessory system to heat. However, such a location is even further from the rotating components of the turbomachine 120.

Notably, certain prior gas turbine engines 100 included individual heat exchangers for each of these accessory systems to remove heat from air and/or lubrication in such systems. However, aspects of the present disclosure include a thermal management system 600 (see FIG. 18) for transferring heat from some or all of such accessory systems to more efficiently remove such heat.

It should be appreciated, however, that the exemplary gas turbine engine 100 depicted in FIG. 17 is by way of example only, and that in other exemplary embodiments, aspects of the present disclosure may additionally, or alternatively, be applied to any other suitable gas turbine engine. For example, in other exemplary embodiments, the exemplary gas turbine engine 100 may include or be operably connected to any other suitable accessory systems. Additionally, or alternatively, the exemplary gas turbine engine 100 may not include or be operably connected to one or more of the accessory systems discussed above.

Figure 18:
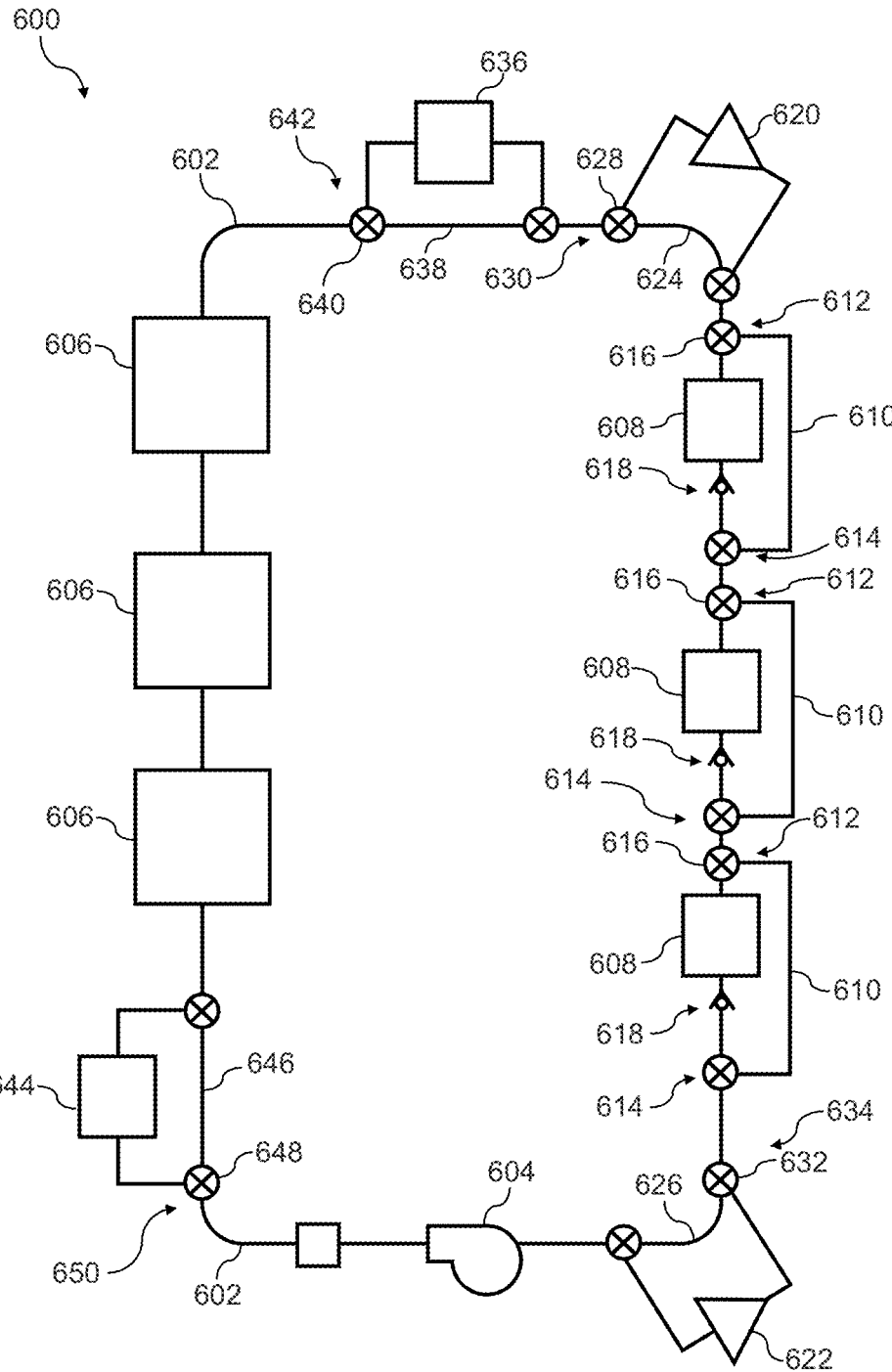
FIG. 18 is a simplified schematic view of a thermal management system in accordance with an exemplary embodiment of the present disclosure.

Referring now to FIG. 18, a schematic view is provided of a thermal management system 600 in accordance with an exemplary embodiment of the present disclosure for incorporation at least partially into the exemplary gas turbine engine 100 of FIG. 17.

As shown, the thermal management system 600 includes a thermal transport bus 602. The thermal transport bus 602 includes an intermediary heat exchange fluid flowing therethrough and may be formed of one or more suitable fluid conduits. The heat exchange fluid may be an incompressible fluid having a high temperature operating range. For example, in certain embodiments, heat exchange fluid may be a water and ethanol mixture, or any suitable dielectric fluid.

It will be appreciated that in certain exemplary embodiments, the heat exchange fluid may be a single phase heat exchange fluid, configured to, e.g., remain in a liquid phase throughout an expected operational temperature range of the thermal management system 600.

In additional exemplary embodiments, the heat exchange fluid may alternatively be a phase change fluid (configured to change between, e.g., liquid and gas phases across the expected operational temperature range of the thermal management system 600), a supercritical heat exchange fluid (such as a supercritical $CO_2$), etc.

A pump 604 is provided in fluid communication with the heat exchange fluid in the thermal transport bus 602 for generating a flow of the heat exchange fluid in the thermal transport bus 602 and, e.g., facilitating a desired phase of the heat exchange fluid through management of a pressure of the heat exchange fluid. As viewed in FIG. 18, the pump 604 may generate a flow of the heat exchange fluid generally in a clockwise direction through the thermal transport bus 602. The pump 604 may be a rotary pump including an impeller, or alternatively may be any other suitable fluid pump. Additionally, the pump 604 may be powered by an electric motor, or alternatively may be in mechanical communication with and powered by, e.g., the HP shaft 136 or the LP shaft 138 of the turbofan engine 10.

Referring still to FIG. 18, the exemplary thermal management system 600 includes a plurality of heat source exchangers 606 in thermal communication with the heat exchange fluid in the thermal transport bus 602. The plurality of heat source exchangers 606 are configured to transfer heat from one or more of the accessory systems of the gas turbine engine 100 (or in operable communication with the gas turbine engine 100) to the heat exchange fluid in the thermal transport bus 602. In certain exemplary embodiments, the plurality of heat source exchangers 606 may include two or more of: a main lubrication system heat exchanger for transferring heat from the main lubrication system 578 (see FIG. 17); a CCA system heat source exchanger for transferring heat from the CCA system 580 (see FIG. 17); an ACC system heat source exchanger for transferring heat from the ACC system 582 (see FIG. 17); a generator lubrication system heat source exchanger for transferring heat from the generator lubrication system 584 (see FIG. 17); an ECS heat exchanger for transferring heat from the ECS 586 (see FIG. 17); and an electronics cooling system heat exchanger for transferring heat from the electronics cooling system 588 (see FIG. 17). Accordingly, a thermal management system 600 in accordance with an exemplary embodiment of FIG. 18 may transfer heat from a variety of independent systems to the heat exchange fluid in the thermal transport bus 602 for removal.

In particular, for the embodiment depicted, the thermal management system 600 includes three heat source exchangers 606, the three heat source exchangers 606 each arranged in series flow along the thermal transport bus 602.

It will be appreciated, however, that in other exemplary embodiments, any other suitable number of heat source exchangers 606 may be included and one or more of the heat source exchangers 606 may be arranged in parallel flow along the thermal transport bus 602. For example, in other embodiments, there may only be at least two heat source exchangers 606 in thermal communication with the heat exchange fluid in the thermal transport bus 602, or alternatively, there may be at least four, five, or six heat source exchangers 606 in thermal communication with heat exchange fluid in the thermal transport bus 602.

Referring still to the exemplary thermal management system 600 of FIG. 18, the exemplary thermal management system 600 further includes at least one heat sink exchanger 608 permanently or selectively in thermal communication with the heat exchange fluid in the thermal transport bus 602. The at least one heat sink exchanger 608 is located downstream of the plurality of heat source exchangers 606 and is configured for transferring heat from the heat exchange fluid in the thermal transport bus 602, e.g., to atmosphere, to fuel, to a fan stream, to a fan duct, etc. For example, in certain embodiments the at least one heat sink exchanger 608 may include at least one of a RAM heat exchanger, a fuel heat exchanger, a fan stream heat exchanger (see, e.g., heat exchanger 194 in fan duct 172 in FIG. 17), a bleed air heat exchanger, or a de-icing module.

Figure 19:
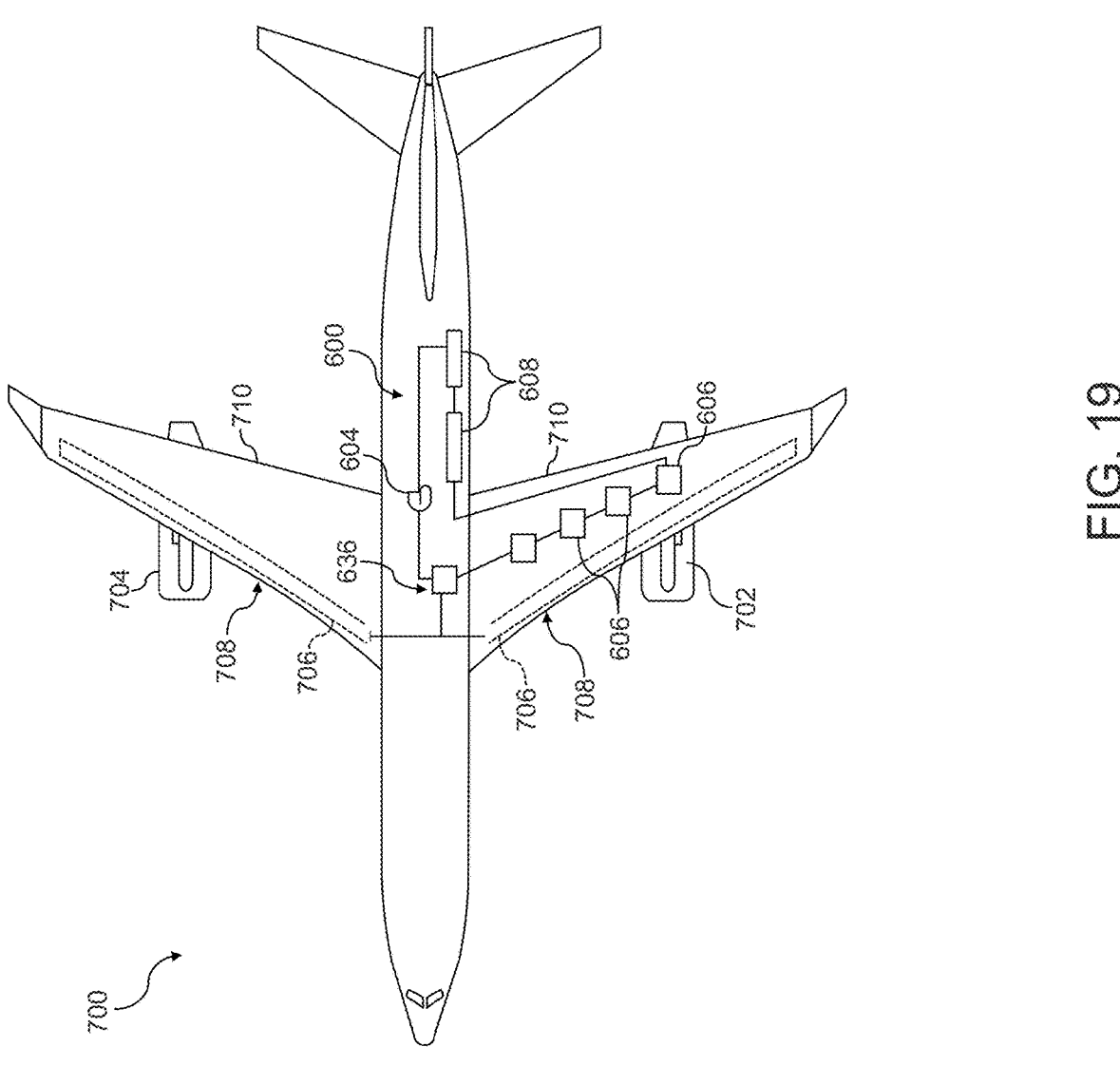
FIG. 19 is a simplified schematic view of a thermal management system in accordance with another exemplary embodiment of the present disclosure.

As will be appreciated, the RAM heat exchanger may be configured as an "air to heat exchange fluid" heat exchanger integrated into one or both of the gas turbine engine 100 or an aircraft including the gas turbine engine 100 (see FIG. 19). During operation, the RAM heat exchanger may remove heat from any heat exchange fluid therein by flowing a certain amount of RAM air over the RAM heat exchanger. Additionally, the fuel heat exchanger is a "fluid to heat exchange fluid" heat exchanger wherein heat from the heat exchange fluid is transferred to a stream of liquid fuel for the gas turbine engine 100. Moreover, the fan stream heat exchanger is generally an "air to heat exchange fluid" heat exchanger which flows, e.g., airflow through the fan duct 172 over heat exchange fluid to remove heat from the heat exchange fluid. Further, the bleed air heat exchanger is generally an "air to heat exchange fluid" heat exchanger which flows, e.g., bleed air from the LP compressor over heat exchange fluid to remove heat from the heat exchange fluid.

Moreover, as noted above, the at least one heat sink heat exchangers 608 can include a system for de-icing certain components of an aircraft. Specifically, the exemplary thermal management system 600 includes a heat sink heat exchanger 608 configured as a de-icing module 636 in thermal communication with the heat exchange fluid in the thermal transport bus 602 at a location downstream of the plurality of heat source exchangers 606. The de-icing module 636 may be configured to utilize heat from the heat exchange fluid in the thermal transport bus 602 to warm components of the aircraft susceptible to icing. Depending on, e.g., the aircraft and atmospheric conditions, ice may be prone to forming on the fuselage of the aircraft, the wings of the aircraft, etc. (see, also, FIG. 19). Accordingly, in certain embodiments, the de-icing module 636 may include one or more fluid lines (not shown) mounted in thermal communication with a surface of e.g., the fuselage of the aircraft, the wings of the aircraft, etc. When utilized, the fluid lines of the de-icing module 636 may provide a flow of the heat exchange fluid in the thermal transport bus 602 therethrough, or alternatively, may have a separate de-icing fluid that transfers heat from the heat exchange fluid using, e.g., a de-icing heat exchanger (not shown).

Referring still to the embodiment of FIG. 18, the at least one heat sink exchanger 608 of the thermal management system 600 depicted includes a plurality of individual heat sink exchangers 608, with at least one configured as the de-icing module 636. More particularly, for the embodiment of FIG. 18, the at least one heat sink exchanger 608 includes four heat sink exchangers 608 arranged in series. The four heat sink exchangers 608 are configured as the de-icing module 636, a RAM heat exchanger, a fuel heat exchanger, and a fan stream heat exchanger.

However, in other exemplary embodiments, the at least one heat sink exchanger 608 may include any other suitable number of heat sink exchangers 608. For example, in other exemplary embodiments, a single heat sink exchanger 608 may be provided, at least two heat sink exchangers 608 may be provided, at least four heat sink exchangers 608 may be provided, or at least five heat sink exchangers 608 may be provided. Additionally, in still other exemplary embodiments, two or more of the at least one heat sink exchangers 608 may alternatively be arranged in parallel flow with one another.

The plurality of heat sink exchangers 608 depicted are selectively in thermal communication with the heat exchange fluid in the thermal transport bus 602. More particularly, the thermal management system 600 depicted includes a plurality of bypass lines 610 for selectively bypassing each heat sink exchanger 608 in the plurality of heat sink exchangers 608. As will be appreciated from FIG. 18, each bypass line 610 extends between an upstream juncture 612 and a downstream juncture 614—the upstream juncture 612 located just upstream of a respective heat sink exchanger 608, and the downstream juncture 614 located just downstream of the respective heat sink exchanger 608. Additionally, the thermal management system 600 includes a plurality of three-way heat sink valves 616, and each bypass line 610 meets at the respective upstream juncture 612 with the thermal transport bus 602 via a respective three-way heat sink valve 616. The three-way heat sink valves 616 each include an inlet fluidly connected with the thermal transport bus 602, a first outlet fluidly connected with the thermal transport bus 602, and a second outlet fluidly connected with the bypass line 610. The three-way heat sink valves 616 may each be a variable throughput three-way valve, such that the three-way heat sink valves 616 may vary a throughput from the inlet to the first and/or second outlets. For example, the three-way heat sink valves 616 may be configured for providing anywhere between zero percent (0%) and one hundred percent (100%) of the heat exchange fluid from the inlet to the first outlet, and similarly, the three-way heat sink valves 616 may be configured for providing anywhere between zero percent (0%) and one hundred percent (100%) of the heat exchange fluid from the inlet to the second outlet.

The thermal management system 600 additionally includes a bypass line 638 for selectively bypassing the de-icing module 636. A three-way de-icing module valve 640 is positioned at an upstream juncture 642 for selectively activating the de-icing module 636. The three-way de-icing module valve 640 may be configured in substantially the same manner as the exemplary three-way heat sink valves 616 described above for bypassing operation of a respective heat sink exchanger 608.

Notably, the three-way heat sink valves 616 and three-way de-icing module valve 640 may be in operable communication with a controller of the gas turbine engine 100 and/or of an aircraft including the gas turbine engine 100. The controller may bypass one or more of the at least one heat sink exchangers 608 (including the de-icing module 636) based on, e.g., an operating condition of the gas turbine engine 100 and/or aircraft, a temperature of the heat exchange fluid, and/or any other suitable variables. Alternatively, the controller may bypass one or more of the at least one heat sink exchangers 608 based on a user input.

Further, each bypass line 610 also meets at the respective downstream juncture 614 with the thermal transport bus 602. Between each heat sink exchanger 608 and downstream juncture 614, the thermal transport bus 602 includes a check valve 618 for ensuring a proper flow direction of the heat exchange fluid. More particularly, the check valve 618 prevents a flow of heat exchange fluid from the downstream juncture 614 towards the respective heat sink exchanger 608.

The thermal management system 600 of FIG. 18 may more efficiently remove heat from the various accessory systems of the gas turbine engine 100 and/or the aircraft. For example, the various accessory systems may generate a varying amount of heat dependent on various operating conditions of the gas turbine engine 100 and/or the aircraft. However, not all of the accessory systems define the same heat pattern (i.e., not all of the accessory systems heat up and cool down at the same time). For example, the main lubrication system 578 may require a maximum amount of heat removal during high load conditions of the gas turbine engine 100. By contrast, however, the ECS 586 may require a max amount of heat removal during high-altitude flight. Further, the de-icing module 636 may require a max amount of heat during a various other operating conditions.

Accordingly, by integrating the heat removal for the variety of different accessory systems, less heat exchangers may be required to remove a desired amount of heat and/or smaller heat exchangers may be required to remove a desired amount of heat.

It will further be appreciated that due to the configuration of the various heat sink exchangers 608 being in selective thermal communication with the heat exchange fluid in the thermal transport bus 602, heat may be removed from the various accessory systems in a more efficient manner. By way of example, when a relatively low amount of heat is required to be removed from the heat exchange fluid, the most efficient heat sink exchanger 608 may be utilized and the others bypassed. By contrast, when a relatively high amount of heat is required to be removed from the heat exchange fluid, the additional heat sink exchangers 608 may also be utilized. Such a configuration may allow for utilization of the fuel heat exchanger without risk of heating the fuel to a point where de-oxygenation systems are required to be included. For example, prior fuel heat exchangers run the risk of fuel coking or deposit formation within the fuel system when a temperature of the fuel is increased past a predetermined threshold (thus requiring the de-oxygenation systems). Due to the redundant and selective configuration of the various heat sink exchangers 608 for the embodiment depicted, however, utilization of the fuel heat exchanger may be ceased prior to the fuel reaching such a predetermined threshold.

Moreover, in the exemplary embodiments including a plurality of heat sink exchangers 608 having bypass capability, for example, the additional heat sink exchangers have the benefit of adding redundancy to the thermal management system 600. For example, in the event of a failure of one or more of the heat sink exchangers 608 or associated portions of the thermal transport bus 602, the heat exchange fluid may be routed around such failure and the system 600 may continue to provide at least some heat removal.

Furthermore, it should be appreciated that in at least certain exemplary embodiments, the thermal management system 600 may be used as a heater for components other than the de-icing module 636. For example, the thermal management system 600 may additionally be configured to heat oil, for example, when operating in cold conditions or when starting the aircraft and/or engine. For example, in certain exemplary embodiments, the thermal management system 600 may bypass each of the heat sink exchangers 608 such that heat from one of the heat source exchangers 606 may be used to heat oil from a different one of the heat sources. For example, heat from one of the heat source exchangers 606 may be used to heat lubrication oil from the main lubrication system 578 to allow for a proper lubrication oil viscosity in a power gearbox 546.

Referring still to FIG. 18, as noted above, the thermal management system 600 can utilize a phase change fluid for the heat exchange fluid. For example, the exemplary thermal management system 600 depicted further utilizes a refrigeration cycle to more efficiently remove heat from the various heat source exchangers 606. Specifically, the thermal management system 600 includes a compressor 620 for compressing the heat exchange fluid in the thermal transport bus 602, and an expansion device 622 for expanding the heat exchange fluid in the thermal transport bus 602. Notably, with such a configuration (and others), the heat exchange fluid may not be an incompressible fluid. The compressor 620 is selectively in fluid communication with the heat exchange fluid at a location downstream of the heat source exchangers 606 and upstream of the at least one heat sink exchanger 608. By contrast, the expansion device 622 is selectively in fluid communication with the heat exchange fluid at a location downstream of the at least one heat sink exchanger 608 and upstream of the heat source exchangers 606. Notably, the compressor 620 may in certain exemplary embodiments be combined with the pump 604, such that the thermal management system 600 may not include both a compressor 620 and a pump 604.

In such an exemplary embodiment, the compressor 620 may be driven by, e.g., an electric motor, or alternatively may be in mechanical communication with and driven by a rotary component of the gas turbine engine 100, such as the HP shaft 136 or the LP shaft 138. Notably, with such a configuration, the one or more heat sink exchangers 608 acts as a condenser, and the plurality of heat source exchangers 606 acts as an evaporator. Such a configuration may allow for more efficient heat removal from the various heat source exchangers 606, and heat transfer to the one or more heat sink exchangers 608. It should also be appreciated, that in certain exemplary embodiments, the expansion device 622 may be utilized as a power generating device configured to generate rotational power from a flow of heat exchange fluid therethrough.

Moreover, as is depicted in FIG. 18, the thermal transport bus 602 additionally includes a compressor bypass line 624 for selectively bypassing the compressor 620 and an expansion device bypass line 626 for selectively bypassing the expansion device 622. Moreover, a three-way compressor bypass valve 628 is positioned at an upstream juncture 630 for selectively bypassing the compressor 620, and similarly, a three-way expansion device bypass valve 632 is positioned at an upstream juncture 634 for selectively bypassing the expansion device 622. The three-way compressor bypass valve 628 and three-way expansion device bypass valve 632 may each be configured in substantially the same manner as the exemplary three-way heat sink valves 616 described above for bypassing operation of a respective heat sink exchanger 608.

Further, the exemplary thermal management system 600 of FIG. 18 additionally includes a fuel chiller 644 selectively in thermal communication with heat exchange fluid in the thermal transport bus 602 at a location upstream of the plurality of heat source exchangers 606 and downstream of the at least one heat sink exchangers 608. The fuel chiller 644 may be configured to remove heat from the fuel of the gas turbine engine 100 to assist with maintaining the fuel within a desired temperature range. As with various other components of the thermal management system 600 of FIG. 18, the thermal management system 600 additionally includes a fuel chiller bypass line 646 for selectively bypassing the fuel chiller 644 and a three-way fuel chiller bypass valve 648. The three-way fuel chiller bypass valve 648 is located at an upstream juncture 650 and fluidly connects the thermal transport bus 602 and fuel chiller bypass line 646. The fuel chiller bypass valve 648 may be a variable throughput three-way valve configured in substantially the same manner as the exemplary three-way heat sink valves 616 described above for bypassing operation of a respective heat sink exchanger 608.

It should be appreciated, however, that the thermal management system 600 described above with respect to FIG. 18 is provided by way of example only, and that in other exemplary embodiments, the thermal management system 600 may be configured in any other suitable manner. For example, in other exemplary embodiments of the present disclosure, the thermal management system 600 may not be configured to operate on a refrigerant cycle, e.g., the thermal management system 600 may not include one or both of the compressor 620 or the expansion device 622. Additionally, in other exemplary embodiments, the thermal management system 600 may not include certain other components depicted in FIG. 18, such as the de-icing module 636 and/or the fuel chiller 644, or alternatively may include other components not described herein.

As will be appreciated, a thermal management system in accordance with an exemplary embodiment present disclosure may allow for a gas turbine engine and aircraft including such a gas turbine engine to operate more efficiently. For example, inclusion of a thermal management system in accordance with an exemplary embodiment of the present disclosure may allow for a reduction in volume of a core of the gas turbine engine as less heat exchangers and/or smaller heat exchangers may be required to maintain a desired amount of heat removal. This reduction can enable lowering a peak cowl diameter (D), allowing the gas turbine engine to define the core cowl diameter ratio (CDR) and core cowl length ratio (CLR) discussed hereinabove. Additionally, the heat removed using a thermal management system in accordance with an exemplary embodiment of the present disclosure may allow for redirection of such heat to one or more accessory systems that require heat to operate, improving an overall efficiency of the gas turbine engine.

Referring now to FIG. 19, a thermal management system 600 in accordance with another exemplary embodiment of the present disclosure is provided. The exemplary thermal management system 600 depicted schematically in FIG. 19 may be configured in substantially the same manner as the exemplary thermal management system 600 described above with reference to FIG. 18. The same or similar numerals have been used in FIG. 19 to identify the same or similar components as the thermal management system 600 of FIG. 18.

Referring to FIG. 19, the thermal management system 600 is incorporated into an aircraft 700 and at least partially into a gas turbine engine. Specifically, the thermal management system 600 is incorporated into the aircraft 700 and a first gas turbine engine 702 and/or a second gas turbine engine 704 of the aircraft 700. The first and second gas turbine engines 702, 704 may each be configured in substantially the same manner as the exemplary gas turbine engine 100 described above with reference to FIG. 17.

Moreover, as is depicted, the exemplary thermal management system 600 of FIG. 19 includes a thermal transport bus 602 having a heat exchange fluid flowing therethrough, along with a pump 604 for generating a flow of the heat exchange fluid in the thermal transport bus 602. Further, the exemplary thermal management system 600 includes a plurality of heat source exchangers 606 and at least one heat sink exchanger 608. The plurality of heat source exchangers 606 are in thermal communication with the heat exchange fluid in the thermal transport bus 602 and the at least one heat sink exchanger 608 permanently or selectively in thermal communication with the heat exchange fluid in a thermal transport bus 602.

As with the exemplary thermal management system 600 described above with reference to FIG. 18, for the exemplary thermal management system 600 of FIG. 19, the at least one heat sink exchangers 608 are positioned at a location downstream of the plurality of heat source exchangers 606.

However, for the embodiment of FIG. 19, the exemplary thermal management system 600 may be integrated into both the aircraft 700 and the gas turbine engine 702. For example, in the exemplary embodiment of FIG. 19, one or more of the heat source exchangers 606 may be located in the gas turbine engine 702 and one or more of the heat source exchangers 606 may be located in the aircraft 700. Similarly, one or more of the heat sink exchangers 608 may be located in the gas turbine engine 702 and one or more of the heat sink exchangers 608 may be located in the aircraft 700.

Additionally, other elements of the exemplary thermal management system 600 may be positioned at any suitable location. For example, as is depicted schematically, the thermal management system 600 of FIG. 19 includes one of the heat sink exchangers 606 configured as a de-icing module 636 having thermal lines 706 (depicted in phantom) for heating certain components of the aircraft 700. Accordingly, the thermal lines 706 of the de-icing module 636 may prevent or remedy icing conditions on, e.g., a forward edge 708 of a wing 710 of the aircraft 700 and other locations.

For example, although depicted as integrated into aspects of the aircraft 700, in other exemplary embodiments, the de-icing module 635 may include thermal lines 706 incorporated into parts of the gas turbine engine 702 prone to icing conditions.

This written description uses examples to disclose the present disclosure, including the best mode, and to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine defining an axial direction and a radial direction, the gas turbine engine comprising a turbomachine having an unducted primary fan, a core engine including a combustor and a combustor casing enclosing the combustor and defining an outer surface, and a core cowl surrounding at least a portion of the core engine and defining an inner surface and an outer surface. Wherein the outer surface of the core cowl defines a peak cowl diameter (D) in the radial direction, the outer surface of the combustor casing defines a maximum combustor casing diameter (d) along the radial direction, the core engine defines an overall core axial length (L) along the axial direction and an under-core cowl axial length (L1) along the axial direction, wherein the gas turbine engine defines a core cowl diameter ratio (CDR) equal to the peak cowl diameter (D) divided by the maximum combustor casing diameter (d) and a core cowl length ratio (CLR) equal to the under-core cowl axial length (L1) divided by the overall core axial length (L), and wherein the CDR is between 2.7 and 3.5 and wherein the CLR is between 0.25 and 0.50.

The gas turbine engine of the preceding clause, wherein the CDR is between 2.8 and 3.3.

The gas turbine engine of any preceding clause, wherein the CLR is between 0.3 and 0.45.

The gas turbine engine of any preceding clause, wherein the CLR is between 0.40 and 0.45.

The gas turbine engine of any preceding clause, wherein a void is defined between the outer surface of the combustor casing and the inner surface of the core cowl.

The gas turbine engine of any preceding clause, further comprising at least one engine accessory coupled to the inner surface of the core cowl.

The gas turbine engine of any preceding clause, further comprising a rear frame including a strut having a trailing edge, wherein the primary fan includes a primary fan blade having a leading edge, and wherein the overall core axial length (L) along the axial direction is measured from the leading edge of the primary fan blade to the trailing edge of the strut.

The gas turbine engine of any preceding clause, further comprising a high-pressure compressor inlet guide vane having a leading edge, and a rear frame including a strut having a trailing edge, wherein the under-core cowl axial length (L1) along the axial direction is measured from the leading edge of the inlet guide vane to the trailing edge of the strut.

The gas turbine engine of any preceding clause, further comprising a ducted secondary fan disposed downstream from the primary fan.

The gas turbine engine of any preceding clause, wherein the ducted secondary fan is a single stage secondary fan.

The gas turbine engine of any preceding clause, wherein the gas turbine engine is a three-stream gas turbine engine.

An aircraft, comprising a wing and a gas turbine engine mounted to the wing, the gas turbine engine defining an axial direction and a radial direction, the gas turbine engine comprising: a turbomachine having an unducted primary fan, a core engine including a combustor and a combustor casing enclosing the combustor and defining an outer surface, a core cowl surrounding at least a portion of the core engine and defining an inner surface and an outer surface. Wherein the outer surface of the core cowl defines a peak cowl diameter (D) in the radial direction, the outer surface of the combustor casing defines a maximum combustor casing diameter (d) along the radial direction, the core engine defines an overall core axial length (L) along the axial direction and an under-core cowl axial length (L1) along the axial direction. Wherein the gas turbine engine defines a core cowl diameter ratio (CDR) equal to the peak cowl diameter (D) divided by the maximum combustor casing diameter (d) and a core cowl length ratio (CLR) equal to the under-core cowl axial length (L1) divided by the overall core axial length (L). Wherein the CDR is between 2.7 and 3.5 and wherein the CLR is between 0.25 and 0.50.

The aircraft as in the preceding clause, wherein the CDR is between 2.8 and 3.3.

The aircraft of any preceding clause, wherein the CLR is between 0.3 and 0.45.

The aircraft of any preceding clause, wherein the CLR is between 0.40 and 0.45.

The aircraft of any preceding clause, wherein a void is defined between the outer surface of the combustor casing and the inner surface of the core cowl of the gas turbine engine, and wherein at least one engine accessory is coupled to the inner surface of the core cowl.

The aircraft of any preceding clause, wherein the gas turbine engine further comprises a rear frame including a strut having a trailing edge, wherein the primary fan includes a plurality of primary fan blades where each primary fan blade has a leading edge, and wherein the overall core axial length (L) along the axial direction is measured from a leading edge of a respective primary fan blade of the plurality of primary fan blades to the trailing edge of the strut.

The aircraft of any preceding clause, wherein the gas turbine engine further comprises a high-pressure compressor inlet guide vane having a leading edge, and a rear frame including a strut having a trailing edge, wherein the under-core cowl axial length (L1) along the axial direction is measured from the leading edge of the inlet guide vane to the trailing edge of the strut.

The aircraft of any preceding clause, the gas turbine engine further comprising a ducted secondary fan disposed downstream from the unducted primary fan.

A gas turbine engine, comprising: a core engine; a core cowl at least partially encasing a portion of the core engine, the core cowl having an inner surface and defining in part a void is between the inner surface and the core engine, the core cowl moveable relative to the core engine; and an engine component selectively coupled to the core engine or the core cowl.

The gas turbine engine of the preceding clause, wherein the core cowl is pivotable relative to the core engine.

A gas turbine engine, comprising a turbomachine and a housing at least partially encasing a portion of the turbomachine, the housing having an inner surface and defining in part a void between the inner surface and the portion of the turbomachine, the housing moveable relative to the portion of the turbomachine; and an engine component selectively coupled to the portion of the turbomachine or to the housing.

The gas turbine engine of the preceding clause, wherein the turbomachinery comprises a core engine, the housing comprises a core cowl at least partially encasing a portion of the core engine, the core cowl having an inner surface and defining in part a void between the inner surface and the core engine, wherein the core cowl is moveable relative to the core engine, and an engine component selectively coupled to the core engine or the core cowl, and wherein the core cowl is pivotable relative to the core engine.

The gas turbine engine of any preceding clause, wherein when the engine component is selectively coupled to the core cowl, the engine component travels with the core cowl when the core cowl is moved away from the core engine.

The gas turbine engine of any preceding clause, wherein the engine component is one of a heat exchanger, a sensor, a controller, a pump, a duct, a fire and overheat component, a generator, or a valve.

The gas turbine engine of any preceding clause, further comprising: a fastener, wherein the engine component is selectively connected to the core engine or the core cowl via the fastener.

The gas turbine engine of any preceding clause, wherein the core cowl defines an access opening, wherein the fastener is accessible through the access opening.

The gas turbine engine of any preceding clause, wherein the fastener includes a plurality of articulating tabs, wherein in a first position the plurality of articulating tabs engages with the core engine and the engine component and in a second position the plurality of tabs engages with the core cowl and the engine component.

The gas turbine engine of any preceding clause, further comprising a push-pull mechanism including a first pin, wherein the engine component is selectively coupled to the core engine or the core cowl via the push-pull mechanism, wherein the first pin engages with the core engine and the engine component when the push-pull mechanism is in a first position, and the first pin engages with the engine component and the core cowl when the push-pull mechanism is in a second position.

The gas turbine engine of any preceding clause, wherein the push-pull mechanism is manually actuated between the first position and the second position.

The gas turbine engine of any preceding clause, wherein the push-pull mechanism is electrically actuated between the first position and the second position.

The gas turbine engine of any preceding clause, wherein the push-pull mechanism includes a second pin, wherein the second pin engages with a door counterbalance mechanism when the first pin is engaged with the engine component and the core cowl.

The gas turbine engine of any preceding clause, wherein the gas turbine engine includes an unducted primary fan.

The gas turbine engine of any preceding clause, further comprising a ducted secondary fan disposed downstream from the primary fan, wherein the ducted secondary fan is a single stage secondary fan or a multi-stage secondary fan.

An aircraft, comprising a core engine and a core cowl at least partially encasing a portion of the core engine. The core cowl having an inner surface, wherein a void is defined between the inner surface and the core engine, wherein the core cowl is pivotally mounted to the gas turbine engine, and an engine component selectively coupled to the core engine or the core cowl.

The aircraft as in the preceding clause, wherein the engine component is selectively coupled to the core cowl, and wherein the engine component travels with the core cowl when the core cowl is pivoted away from the core engine.

The aircraft of any preceding clause, wherein the engine component is one of a heat exchanger, a sensor, a controller, a pump, a duct, a fire and overheat component, a generator, or a valve.

The aircraft of any preceding clause, wherein the engine component is selectively coupled to the core engine or the core cowl via a fastener, wherein the fastener is accessible from outside of the core cowl, wherein the fastener includes a plurality of articulating tabs, and wherein in a first position the plurality of articulating tabs engages with the core engine and the engine component, and in a second position the plurality of articulating tabs engages with the core cowl and the engine component.

The aircraft of any preceding clause, wherein the engine component is selectively coupled to the core engine or the core cowl via a push-pull mechanism including a first pin, wherein the first pin engages with the core engine and the engine component when the push-pull mechanism is in a first position, and the first pin engages with the engine component and the core cowl when the push-pull mechanism is in a second position.

The aircraft of any preceding clause, wherein the push-pull mechanism is manually actuated between the first position and the second position.

The aircraft of any preceding clause, wherein the push-pull mechanism includes a second pin, wherein the second pin engages with a door counterbalance mechanism when the first pin is engaged with the core cowl and the engine component.

The aircraft of any preceding clause, wherein the engine component is selectively connected to the core engine or the core cowl via a push-pull mechanism including a first pin, wherein the first pin engages with the core engine and the engine component when the push-pull mechanism is in a first position, and the first pin engages with the engine component and the core cowl when the push-pull mechanism is in a second position, wherein the push-pull mechanism is manually actuatable between the first position and the second position.

The aircraft of any preceding clause, wherein the gas turbine engine includes a ducted primary fan.

The gas turbine engine of any preceding clause, wherein the engine component is positioned within the core cowl.

The gas turbine engine of any preceding clause, wherein the engine component is one of a heat exchanger, a sensor, a controller, a pump, a duct, a fire and overheat component, a generator, or a valve.

The gas turbine engine of any preceding clause, wherein the engine component is an engine controller.

The gas turbine engine of any preceding clause, wherein the engine component is power electronics, a lubrication oil tank, a lubrication oil pump, an electric machine, or a combination thereof.

The gas turbine engine of any preceding clause, wherein the gas turbine engine is incorporated into an aircraft configured to cruise at an altitude between 28,000 feet and 65,000 feet.

The gas turbine engine of any preceding clause, wherein the gas turbine engine is configured to generate at least 18,000 pounds of thrust and less than 80,000 pounds of thrust when operated at a rated speed during standard day operating conditions.

A gas turbine engine defining an axial direction, the gas turbine engine comprising: a turbomachine having a primary fan, a core engine, and a core cowl surrounding at least a portion of the core engine, the turbomachine defining an under-core cowl axial length (L1) along the axial direction and an initial compression axial length (L2), the core engine comprising a gearbox, the primary fan being drivingly coupled to the core engine across the gearbox; wherein the gas turbine engine is configured to generate at least 18,000 pounds of thrust and less than 80,000 pounds of thrust when operated at a rated speed during standard day operating conditions, wherein the turbomachine defines an initial compression length ratio (ICLR) equal to the initial compression axial length (L2) divided by the under-core cowl axial length (L1), wherein the ICLR is greater than or equal to 0.55 and less than or equal to 0.9.

A gas turbine engine defining an axial direction, the gas turbine engine comprising: a turbomachine having a primary fan, a core engine, and a core cowl surrounding at least a portion of the core engine, the turbomachine defining an under-core cowl axial length (L1) along the axial direction and an initial compression axial length (L2), the core engine comprising a gearbox and a turbine section having a low-pressure turbine, the primary fan being drivingly coupled to the low-pressure turbine across the gearbox; wherein the low-pressure turbine comprises at least a total of four stages of low-pressure turbine rotor blades and up to six stages of low-pressure turbine rotor blades; wherein the turbomachine defines an initial compression length ratio (ICLR) equal to the initial compression axial length (L2) divided by the under-core cowl axial length (L1), wherein the ICLR is greater than or equal to 0.3 and less than or equal to 0.9.

A gas turbine engine defining an axial direction, the gas turbine engine comprising: a turbomachine having a primary fan, a core engine, and a core cowl surrounding at least a portion of the core engine, the turbomachine defining an under-core cowl axial length (L1) along the axial direction and an initial compression axial length (L2), the core engine comprising a gearbox having a gear ratio greater than or equal to 3.2:1 and less than or equal to 14:1, the primary fan being drivingly coupled to the core engine across the gearbox; wherein the turbomachine defines an initial compression length ratio (ICLR) equal to the initial compression axial length (L2) divided by the under-core cowl axial length (L1), wherein the ICLR is greater than or equal to 0.3 and less than or equal to 0.9.

A gas turbine engine defining an axial direction, the gas turbine engine comprising: a turbomachine having a primary fan, a core engine, and a core cowl surrounding at least a portion of the core engine, the core engine comprising a high-pressure compressor comprising at least a total of eight stages of high-pressure compressor rotor blades and up to a total of 11 stages of high-pressure compressor rotor blades, the core engine further comprising a gearbox, the primary fan being drivingly coupled to the core engine across the gearbox; wherein the turbomachine defines an under-core cowl axial length (L1) along the axial direction and an initial compression axial length (L2), wherein the turbomachine defines an initial compression length ratio (ICLR) equal to the initial compression axial length (L2) divided by the under-core cowl axial length (L1), wherein the ICLR is greater than or equal to 0.3 and less than or equal to 0.9.

The gas turbine engine of any preceding clause, wherein the ICLR is greater than or equal to 0.55 and less than or equal to 0.9.

The gas turbine engine of any preceding clause, wherein the ICLR is greater than or equal to 0.6 and less than or equal to 0.89.

The gas turbine engine of any preceding clause, wherein the primary fan is an unducted primary fan, and wherein the ICLR is greater than or equal to 0.7.

The gas turbine engine of any preceding clause, wherein the turbomachine further includes a fan cowl and defines a fan duct between the fan cowl and the core cowl configured as a third stream, and wherein the ICLR is greater than or equal to 0.7.

The gas turbine engine of any preceding clause, further comprising a nacelle surrounding at least in part the primary fan, and wherein the ICLR is greater than or equal to 0.6 and less than or equal to 0.75.

The gas turbine engine of any preceding clause, wherein the gas turbine engine is a two stream engine, and wherein the ICLR is greater than or equal to 0.6 and less than or equal to 0.75.

The gas turbine engine of any preceding clause, wherein the core engine comprises a compressor section and a turbine section, wherein the compressor section has a high-pressure compressor comprising a total of eight to ten stages of high-pressure compressor rotor blades, and wherein the turbine section has a low-pressure turbine comprising a total of three to five stages of low-pressure turbine rotor blades.

The gas turbine engine of any preceding clause, wherein the gas turbine engine is configured to generate at least 18,000 pounds of thrust and less than 80,000 pounds of thrust when operated at a rated speed during standard day operating conditions.

The gas turbine engine of any preceding clause, wherein the gas turbine engine is configured to generate between 25,000 and 60,000 pounds of thrust during operation at the rated speed during standard day operating conditions.

The gas turbine engine of any preceding clause, wherein the high-pressure compressor comprises a total of nine stages.

The gas turbine engine of any preceding clause, wherein the low-pressure turbine comprises a total of four stages.

A thermal management system for incorporation at least partially into at least one of a gas turbine engine or an aircraft, the thermal management system comprising: a thermal transport bus having a heat exchange fluid flowing therethrough; a pump for generating a flow of the heat exchange fluid in the thermal transport bus; a plurality of heat source exchangers in thermal communication with the heat exchange fluid in the thermal transport bus, the plurality of heat source exchangers arranged along the thermal transport bus; and at least one heat sink exchanger permanently or selectively in thermal communication with the heat exchange fluid in the thermal transport bus at a location downstream of the plurality of heat source exchangers.

The thermal management system of any preceding clause, wherein the plurality of heat source exchangers are configured to transfer heat from an accessory system of the gas turbine engine to the heat exchange fluid in the thermal transport bus, and wherein the at least one heat sink exchanger is configured to remove heat from the heat exchange fluid in the thermal transport bus.

The thermal management system of any preceding clause, wherein the at least one heat sink exchanger includes a plurality of individual heat sink exchangers.

The thermal management system of any preceding clause, wherein the plurality of heat sink exchangers are selectively in thermal communication with the heat exchange fluid in the thermal transport bus, and wherein the thermal transport bus includes a plurality of bypass lines for selectively bypassing each heat sink exchanger in the plurality of heat sink exchangers.

The thermal management system of any preceding clause, wherein the at least one heat sink exchanger includes at least one air to heat exchange fluid heat exchanger or fuel to heat exchange fluid heat exchanger.

The thermal management system of any preceding clause, wherein the plurality of heat source exchangers includes at least two of an environmental control system precooler, a main lubrication system heat exchanger, a generator lubrication system heat exchanger, an electronics cooling system heat exchanger, a compressor cooling air system heat exchanger, or an active clearance control system heat exchanger.

The thermal management system of any preceding clause, wherein the plurality of heat source exchangers includes at least one air to heat exchange fluid heat exchanger and at least one liquid to heat exchange fluid heat exchanger.

The thermal management system of any preceding clause, wherein the heat exchange fluid is an incompressible fluid.

The thermal management system of any preceding clause, further comprising: a de-icing module in thermal communication with the heat exchange fluid in the thermal transport bus at a location downstream of the plurality of heat source exchangers.

The thermal management system of any preceding clause, wherein the de-icing module utilizes heat from the heat exchange fluid in the thermal transport bus to warm components of an aircraft susceptible to icing.

The thermal management system of any preceding clause, further comprising: a compressor in fluid communication with the heat exchange fluid at a location upstream of the at least one heat sink exchanger for compressing the heat exchange fluid in the thermal transport bus; and an expansion device in fluid communication with the heat exchange fluid at a location downstream of the at least one heat sink exchanger for expanding the heat exchange fluid in the thermal transport bus.

The thermal management system of any preceding clause, further comprising: a fuel chiller in thermal communication with the heat exchange fluid in the thermal transport bus at a location upstream of the plurality of heat source exchangers.

A gas turbine engine comprising: a compressor section coupled to a turbine section by one or more shafts; a main lubrication system for providing lubrication to one or more components located in at least one of the compressor section or the turbine section; and a thermal management system including: a thermal transport bus having a heat exchange fluid flowing therethrough; a plurality of heat source exchangers in thermal communication with the heat exchange fluid in the thermal transport bus, the plurality of heat source exchangers arranged along the thermal transport bus and including a heat exchanger for transferring heat from the main lubrication system to the heat exchange fluid in the thermal transport bus; and at least one heat sink exchanger permanently or selectively in thermal communication with the heat exchange fluid in the thermal transport bus at a location downstream of the plurality of heat source exchangers.

The gas turbine engine of any preceding clause, wherein the at least one heat sink exchanger includes a plurality of individual heat sink exchangers.

The gas turbine engine of any preceding clause, wherein the plurality of heat sink exchangers are selectively in thermal communication with the heat exchange fluid in the thermal transport bus, and wherein the thermal transport bus includes a plurality of bypass lines for selectively bypassing each heat sink exchanger in the plurality of heat sink exchangers.

The gas turbine engine of any preceding clause, wherein the at least one heat sink exchanger includes at least one of a RAM heat exchanger, a fuel heat exchanger, a fan stream heat exchanger, or a bleed air heat exchanger.

The gas turbine engine of any preceding clause, wherein the plurality of heat source exchangers additionally includes an environmental control system precooler, a generator lubrication system heat exchanger, an electronics cooling system heat exchanger, a compressor cooling air system heat exchanger, or an active clearance control system heat exchanger.

The gas turbine engine of any preceding clause, wherein the plurality of heat source exchangers includes at least one air to heat exchange fluid heat exchanger and at least one liquid to heat exchange fluid heat exchanger.

The gas turbine engine of any preceding clause, further comprising a de-icing module in thermal communication with the heat exchange fluid in the thermal transport bus at a location downstream of the plurality of heat source exchangers.

The gas turbine engine of any preceding clause, further comprising a compressor in fluid communication with the heat exchange fluid at a location upstream of the at least one heat sink exchanger for compressing the heat exchange fluid in the thermal transport bus; and an evaporator in fluid communication with the heat exchange fluid at a location downstream of the at least one heat sink exchanger for expanding the heat exchange fluid any thermal transport bus.

A gas turbine engine defining an axial direction and a radial direction, the gas turbine engine comprising: a turbomachine having an unducted primary fan, a core engine including a combustor and a combustor casing enclosing the combustor and defining an outer surface, a core cowl surrounding at least a portion of the core engine and defining an inner surface and an outer surface; a thermal management system comprising a thermal transport bus, a plurality of heat source exchangers configured to be in thermal communication with a heat exchange fluid through the thermal transport bus, and at least one heat sink exchanger configured to be permanently or selectively in thermal communication with the heat exchange fluid in the thermal transport bus at a location downstream of the plurality of heat source exchangers; wherein the outer surface of the core cowl defines a peak cowl diameter (D) in the radial direction, the outer surface of the combustor casing defines a maximum combustor casing diameter (d) along the radial direction, the core engine defines an overall core axial length (L) along the axial direction and an under-core cowl axial length (L1) along the axial direction, wherein the gas turbine engine defines a core cowl diameter ratio (CDR) equal to the peak cowl diameter (D) divided by the maximum combustor casing diameter (d) and a core cowl length ratio (CLR) equal to the under-core cowl axial length (L1) divided by the overall core axial length (L), wherein the CDR is between 2.7 and 3.5 and wherein the CLR is between 0.25 and 0.50.

The gas turbine engine of any preceding clause, wherein the at least one heat sink exchangers is configured as a de-icing module.

The gas turbine engine of any preceding clause, wherein the de-icing module comprises a plurality of thermal lines in thermal communication with a surface of the gas turbine engine.

The gas turbine engine of any preceding clause, wherein the de-icing module is configured to be in communication with a thermal line in thermal communication with a surface of an aircraft.

The gas turbine engine of any preceding clause, wherein the plurality of heat source exchangers comprises a first heat source exchanger and a second heat source exchanger, and wherein the gas turbine engine further comprises: a first accessory system in thermal communication with the first heat source exchanger; and a second accessory system in thermal communication with the second heat source exchanger.

The gas turbine engine of any preceding clause, wherein the thermal transport bus includes a plurality of bypass lines for selectively bypassing each of the at least one heat sink exchangers.

The gas turbine engine of any preceding clause, wherein the at least one heat sink exchanger includes at least one of a RAM heat exchanger, a fuel heat exchanger, a fan stream heat exchanger, or a bleed air heat exchanger.

The gas turbine engine of any preceding clause, wherein the plurality of heat source exchangers includes a main lubrication system heat exchanger, an environmental control system precooler, a generator lubrication system heat exchanger, an electronics cooling system heat exchanger, a compressor cooling air system heat exchanger, an active clearance control system heat exchanger, or a combination thereof.

The gas turbine engine of any preceding clause, wherein the CDR is between 2.8 and 3.3.

The gas turbine engine of any preceding clause, wherein the CLR is between 0.3 and 0.45.

The gas turbine engine of any preceding clause, wherein the CLR is between 0.40 and 0.45.

The gas turbine engine of any preceding clause, wherein a void is defined between the outer surface of the combustor casing and the inner surface of the core cowl.

The gas turbine engine of any preceding clause, further comprising at least one engine accessory coupled to the inner surface of the core cowl.

The gas turbine engine of any preceding clause, further comprising: a rear frame including a strut having a trailing edge, wherein the primary fan includes a primary fan blade having a leading edge, and wherein the overall core axial length (L) along the axial direction is measured from the leading edge of the primary fan blade to the trailing edge of the strut.

The gas turbine engine of any preceding clause, further comprising: a high-pressure compressor inlet guide vane having a leading edge, and a rear frame including a strut having a trailing edge, wherein the under-core cowl axial length (L1) along the axial direction is measured from the leading edge of the inlet guide vane to the trailing edge of the strut.

The gas turbine engine of any preceding clause, further comprising a ducted secondary fan disposed downstream from the primary fan.

The gas turbine engine of any preceding clause, wherein the ducted secondary fan is a single stage secondary fan.

The gas turbine engine of any preceding clause, wherein the gas turbine engine is a three-stream gas turbine engine.

An aircraft, comprising: a wing; and a gas turbine engine mounted to the wing, the gas turbine engine defining an axial direction and a radial direction, the gas turbine engine comprising: a turbomachine having an unducted primary fan, a core engine including a combustor and a combustor casing enclosing the combustor and defining an outer surface, a core cowl surrounding at least a portion of the core engine and defining an inner surface and an outer surface; a thermal management system comprising a thermal transport bus, a plurality of heat source exchangers configured to be in thermal communication with a heat exchange fluid through the thermal transport bus, and at least one heat sink exchanger configured to be permanently or selectively in thermal communication with the heat exchange fluid in the thermal transport bus at a location downstream of the plurality of heat source exchangers; wherein the outer surface of the core cowl defines a peak cowl diameter (D) in the radial direction, the outer surface of the combustor casing defines a maximum combustor casing diameter (d) along the radial direction, the core engine defines an overall core axial length (L) along the axial direction and an under-core cowl axial length (L1) along the axial direction, wherein the gas turbine engine defines a core cowl diameter ratio (CDR) equal to the peak cowl diameter (D) divided by the maximum combustor casing diameter (d) and a core cowl length ratio (CLR) equal to the under-core cowl axial length (L1) divided by the overall core axial length (L), wherein the CDR is between 2.7 and 3.5 and wherein the CLR is between 0.25 and 0.50.

The aircraft of any preceding clause, wherein the at least one heat sink exchangers is configured as a de-icing module. wherein the de-icing module comprises a plurality of thermal lines in thermal communication with a surface of the gas turbine engine, with a surface of an aircraft, or both.

We claim:

1. A gas turbine engine defining an axial direction and a radial direction, the gas turbine engine comprising:
    a turbomachine having an unducted primary fan, a core engine including a combustor and a combustor casing enclosing the combustor and defining an outer surface, a core cowl surrounding at least a portion of the core engine and defining an inner surface and an outer surface;
    a thermal management system comprising a thermal transport bus, a plurality of heat source exchangers configured to be in thermal communication with a heat exchange fluid through the thermal transport bus, and at least one heat sink exchanger configured to be permanently or selectively in thermal communication with the heat exchange fluid in the thermal transport bus at a location downstream of the plurality of heat source exchangers;
    wherein the outer surface of the core cowl defines a peak cowl diameter (D) in the radial direction, the outer surface of the combustor casing defines a maximum combustor casing diameter (d) along the radial direction, the core engine defines an overall core axial length (L) along the axial direction and an under-core cowl axial length (L1) along the axial direction,
    wherein the gas turbine engine defines a core cowl diameter ratio (CDR) equal to the peak cowl diameter (D) divided by the maximum combustor casing diameter (d) and a core cowl length ratio (CLR) equal to the under-core cowl axial length (L1) divided by the overall core axial length (L),
    wherein the CDR is between 2.7 and 3.5 and wherein the CLR is between 0.25 and 0.50.

2. The gas turbine engine of claim 1, wherein the at least one heat sink exchangers is configured as a de-icing module.

3. The gas turbine engine of claim 2, wherein the de-icing module comprises a plurality of thermal lines in thermal communication with a surface of the gas turbine engine.

4. The gas turbine engine of claim 3, wherein the de-icing module is configured to be in communication with a thermal line in thermal communication with a surface of an aircraft.

5. The gas turbine engine of claim 1, wherein the plurality of heat source exchangers comprises a first heat source exchanger and a second heat source exchanger, and wherein the gas turbine engine further comprises:
    a first accessory system in thermal communication with the first heat source exchanger; and
    a second accessory system in thermal communication with the second heat source exchanger.

6. The gas turbine engine of claim 1, wherein the thermal transport bus includes a plurality of bypass lines for selectively bypassing each of the at least one heat sink exchangers.

7. The gas turbine engine of claim 1, wherein the at least one heat sink exchanger includes at least one of a RAM heat exchanger, a fuel heat exchanger, a fan stream heat exchanger, or a bleed air heat exchanger.

8. The gas turbine engine of claim 1, wherein the plurality of heat source exchangers includes a main lubrication system heat exchanger, an environmental control system pre-cooler, a generator lubrication system heat exchanger, an electronics cooling system heat exchanger, a compressor cooling air system heat exchanger, an active clearance control system heat exchanger, or a combination thereof.

9. The gas turbine engine of claim 1, wherein a compressor in fluid communication with the heat exchange fluid at a location upstream of the at least one heat sink exchanger for compressing the heat exchange fluid in the thermal transport bus.

10. The gas turbine engine of claim 1, wherein the thermal management system is located at least partially within the core cowl.

11. The gas turbine engine of claim 1, wherein the CDR is between 2.8 and 3.3.

12. The gas turbine engine of claim 1, wherein the CLR is between 0.3 and 0.45.

13. The gas turbine engine of claim 1, wherein the CLR is between 0.40 and 0.45.

14. The gas turbine engine of claim 1, further comprising:
    a rear frame including a strut having a trailing edge, wherein the primary fan includes a primary fan blade having a leading edge, and wherein the overall core axial length (L) along the axial direction is measured from the leading edge of the primary fan blade to the trailing edge of the strut.

15. The gas turbine engine of claim 1, further comprising:
    a high-pressure compressor inlet guide vane having a leading edge, and a rear frame including a strut having a trailing edge, wherein the under-core cowl axial length (L1) along the axial direction is measured from the leading edge of the inlet guide vane to the trailing edge of the strut.

16. The gas turbine engine of claim 1, further comprising a ducted secondary fan disposed downstream from the primary fan.

17. The gas turbine engine of claim 16, wherein the ducted secondary fan is a single stage secondary fan.

18. The gas turbine engine of claim 16, wherein the gas turbine engine is a three-stream gas turbine engine.

19. An aircraft, comprising:
    a wing; and
    a gas turbine engine mounted to the wing, the gas turbine engine defining an axial direction and a radial direction, the gas turbine engine comprising:
        a turbomachine having an unducted primary fan, a core engine including a combustor and a combustor casing enclosing the combustor and defining an outer surface, a core cowl surrounding at least a portion of the core engine and defining an inner surface and an outer surface;
        a thermal management system comprising a thermal transport bus, a plurality of heat source exchangers configured to be in thermal communication with a heat exchange fluid through the thermal transport bus, and at least one heat sink exchanger configured to be permanently or selectively in thermal communication with the heat exchange fluid in the thermal transport bus at a location downstream of the plurality of heat source exchangers;

wherein the outer surface of the core cowl defines a peak cowl diameter (D) in the radial direction, the outer surface of the combustor casing defines a maximum combustor casing diameter (d) along the radial direction, the core engine defines an overall core axial length (L) along the axial direction and an under-core cowl axial length (L1) along the axial direction, wherein the gas turbine engine defines a core cowl diameter ratio (CDR) equal to the peak cowl diameter (D) divided by the maximum combustor casing diameter (d) and a core cowl length ratio (CLR) equal to the under-core cowl axial length (L1) divided by the overall core axial length (L), wherein the CDR is between 2.7 and 3.5 and wherein the CLR is between 0.25 and 0.50.

20. The aircraft of claim 19, wherein the at least one heat sink exchangers is configured as a de-icing module, wherein the de-icing module comprises a plurality of thermal lines in thermal communication with a surface of the gas turbine engine, with a surface of an aircraft, or both.

* * * * *